United States Patent [19]
Hubacher et al.

[11] Patent Number: 5,631,454
[45] Date of Patent: May 20, 1997

[54] SWITCH AND INSTRUMENT PANEL INTERLOCK LATCH CONTROLLED BY SWITCH ACTUATOR

[75] Inventors: Larry P. Hubacher, Farmington Hills; John H. Montag, Macomb, both of Mich.; James F. Clark, Newport, N.C.

[73] Assignee: TRW Inc., Lyndhurst, Ohio

[21] Appl. No.: 534,327

[22] Filed: Sep. 27, 1995

[51] Int. Cl.$^6$ ................................................. H01H 9/20
[52] U.S. Cl. ......................... 200/50.01; 200/296; 200/318
[58] Field of Search ............................... 200/50.01–50.4, 200/318–327, 293, 295, 296, 61.62, 61.89; 248/27.1, 27.3

[56] References Cited

U.S. PATENT DOCUMENTS 3,759,075  9/1973  Lipschutz ........................ 200/61.89 X
3,841,675  10/1974  Mercer ........................... 200/61.62 X

*Primary Examiner*—J. R. Scott
*Attorney, Agent, or Firm*—Tarolli, Sundheim, Covell, Tummino & Szabo

[57] ABSTRACT

A switch control assembly (26) located in an instrument panel (28) of a vehicle (20) includes a switch assembly (54) which is actuatable between an actuated condition and an unactuated condition. A housing (52) which encloses the switch assembly (54) is connected with the instrument panel (28) by a latch assembly (78). The latch assembly (78) is operable between an engaged condition retaining the housing (52) in the instrument panel (28) and a disengaged condition in which the latch assembly is ineffective to retain the housing in the instrument panel. An actuator member (32) is connected with the switch assembly (54) and is rotatable relative to the housing (52) to actuate the switch assembly. The actuator member (32) can also be rotated relative to the housing (52) to operate the latch assembly (78) to the disengaged condition to release the housing for movement relative to the instrument panel (28). When the latch assembly (78) is in the disengaged condition, the actuator member (32) can be manually pulled to move the housing (52) and the switch assembly (54) out of the instrument panel (28).

61 Claims, 10 Drawing Sheets

SWITCH AND INSTRUMENT PANEL INTERLOCK LATCH CONTROLLED BY SWITCH ACTUATOR

BACKGROUND OF THE INVENTION

The present invention relates to a new and improved switch control assembly and more specifically to a switch control assembly which may be located in a vehicle instrument panel.

A known switch control assembly includes a housing which is connected with a vehicle instrument panel and encloses a switch assembly. An actuator member is connected with the switch assembly and is rotatable to energize vehicle parking lights, headlights and fog lights. A latch assembly is provided to retain the housing in the instrument panel.

When the switch assembly is to be removed from the instrument panel, the actuator member is pulled axially outward from the housing. A tool, such as a screwdriver, is then inserted into an access opening in the actuator member to release the actuator member for disconnection from the switch assembly. Once the actuator member has been disconnected from the switch assembly, a slot formed in the housing and which was previously covered by the actuator member, is exposed. A tool, such as a screwdriver, is inserted into the slot to actuate the latch assembly to a release condition.

Once the latch assembly has been actuated to a release condition, force must be applied to the housing to withdraw the housing from the instrument panel. The force required to withdraw the housing from the instrument panel may be applied to the housing by the tool which extends through the slot to actuate the latch assembly and/or by other tools. However, the tool which extends through the slot to actuate the latch assembly must continue to extend through the slot to hold the latch assembly in a disengaged condition during removal of the housing from the instrument panel.

SUMMARY OF THE INVENTION

The present invention relates to a method and apparatus wherein a housing is retained in an instrument panel by a latch assembly. The housing encloses a switch assembly. An actuator member is movable relative to the housing to actuate the switch assembly.

The actuator member may also be moved relative to the housing to operate the latch assembly to a disengaged condition in which the latch assembly is ineffective to retain the housing in the instrument panel. The actuator member has a latch actuator section which is movable relative to the housing to operate the latch assembly. When the latch assembly is in the disengaged condition, the latch actuator section is effective to transmit force to the housing to move the housing relative to the instrument panel.

In one specific embodiment of the invention, when the housing and switch assembly are to be removed from the instrument panel, the actuator member is disconnected from the switch assembly. The actuator member is then reconnected with the switch assembly with the actuator member in a different orientation. The actuator member is then rotated relative to the housing to actuate the latch assembly to a disengaged condition. Once the latch assembly has been actuated to the disengaged condition, the actuator member is pulled axially outward to move the housing relative to the instrument panel.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF ONE SPECIFIC PREFERRED EMBODIMENT

General Description

Figure 1:
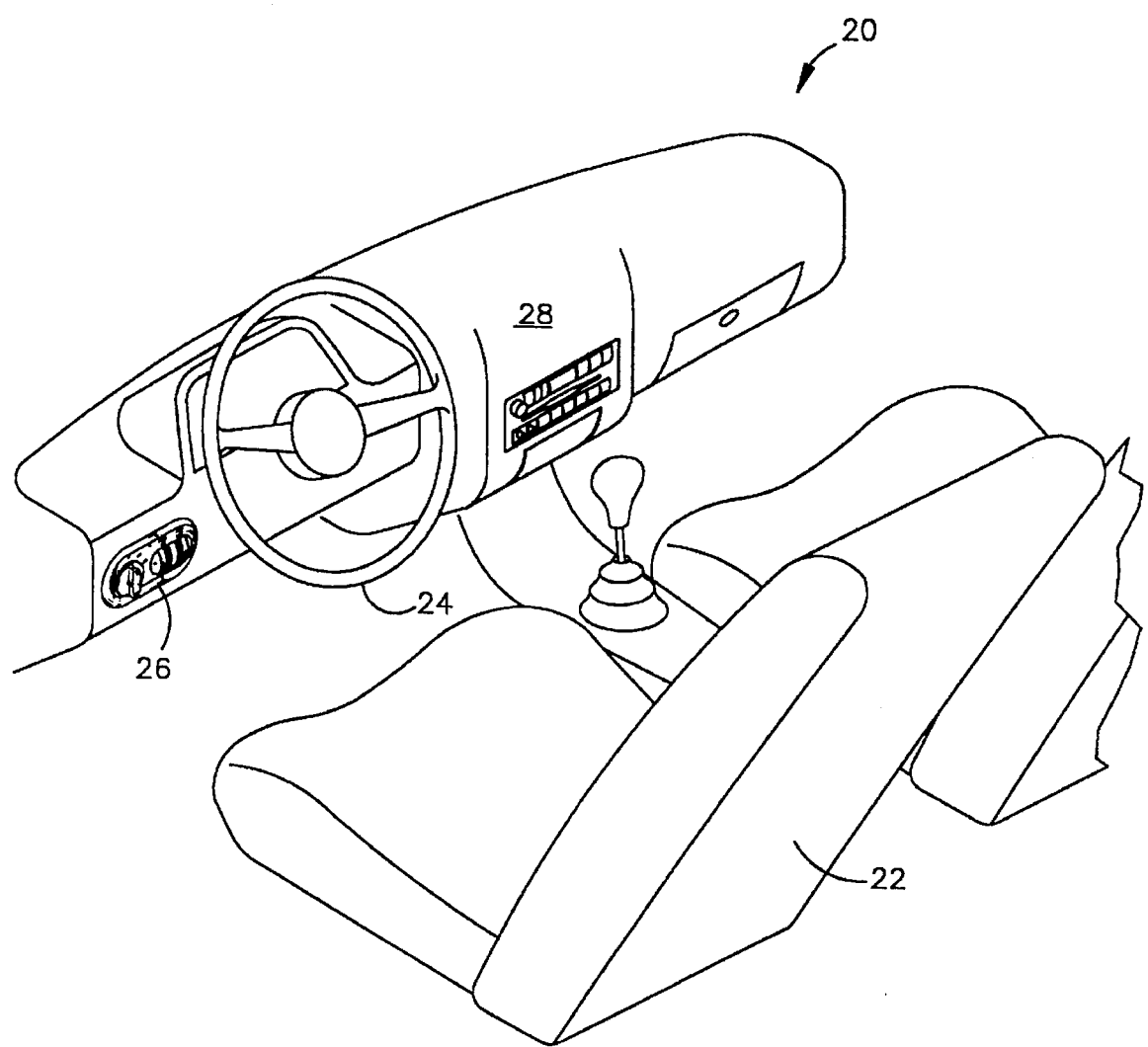
FIG. 1 is a fragmentary pictorial illustration of a vehicle having a switch control assembly constructed and operated in accordance with the present invention.

A driver of a vehicle 20 (FIG. 1) sits in a seat 22 and can manually rotate a steering wheel 24 and actuate a switch control assembly 26. The switch control assembly 26 is constructed in accordance with the present invention and is mounted on an instrument panel 28 of the vehicle 20. The switch control assembly 26 is operable to control energization of vehicle parking lights, headlights and fog lights.

The switch control assembly 26 include an actuator member or knob 32 (FIG. 2) which is manually movable along an actuation path. In the illustrated embodiment of the invention, the actuator member 32 is rotatable in a clockwise direction from an off position shown in FIG. 2 to first energize the parking lights. Continued clockwise rotation of the actuator member 26 moves the actuator member to the position shown in FIG. 3 to energize both the headlights and parking lights. When the actuator member 32 is in the position shown in FIG. 3, the actuator member can be pulled axially outward from the instrument panel 28 to energize the fog lights.

When the actuator member 32 is in the off position (FIG. 2), an indicator 34 on the actuator member is aligned with indicia 36 indicating that the lights are all turned off or de-energized. Upon manual rotation of the actuator member 32 through approximately 27.5° in a clockwise direction about its central axis, the indicator 34 moves into alignment with indicia 38 indicating that the parking lights are energized. Continued clockwise rotation of the actuator member 32 moves the indicator 34 into alignment with indicia 40 (FIG. 3). The indicia 40 indicates that the parking lights and headlights are energized.

To energize the fog lights, the actuator member is first turned to the headlight energized position (FIG. 3) in which the indicator 34 is aligned with the indicia 40. The actuator member 32 is then pulled axially outward. Pulling the actuator member 32 axially outward energizes the fog lights and results in illumination of indicia 42. At this time, the parking lights, headlights and fog lights are all energized.

Figure 2:
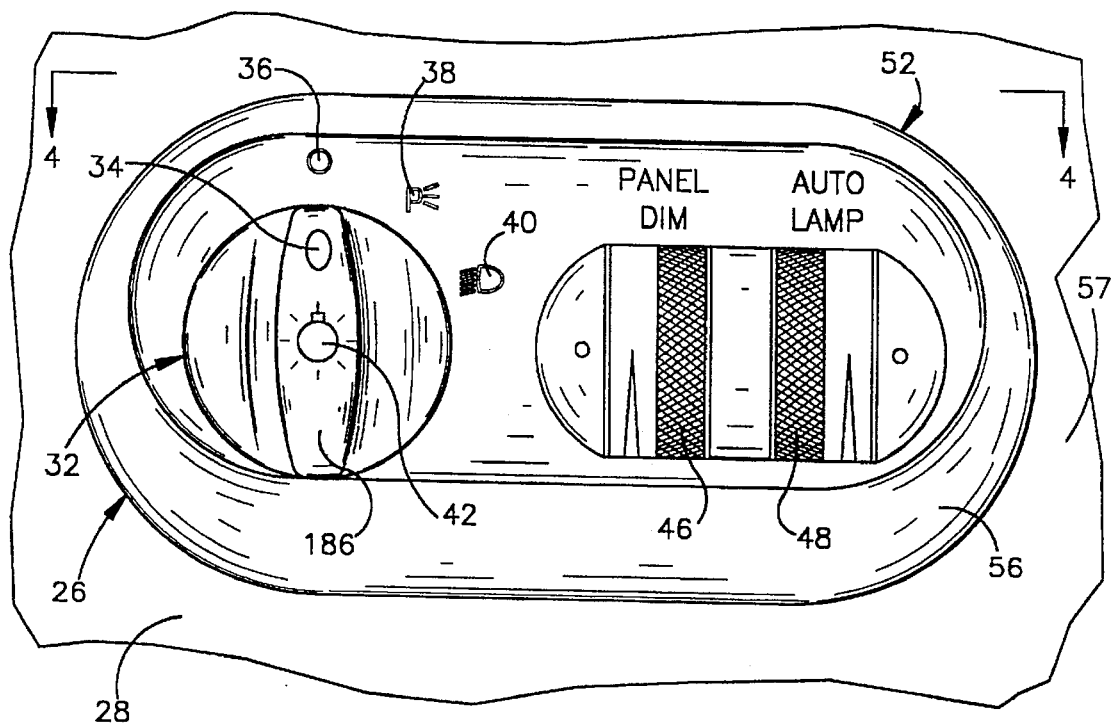
FIG. 2 is an enlarged fragmentary plan view illustrating the switch control assembly of FIG. 1, the switch control assembly being shown in an unactuated condition.
Figure 3:
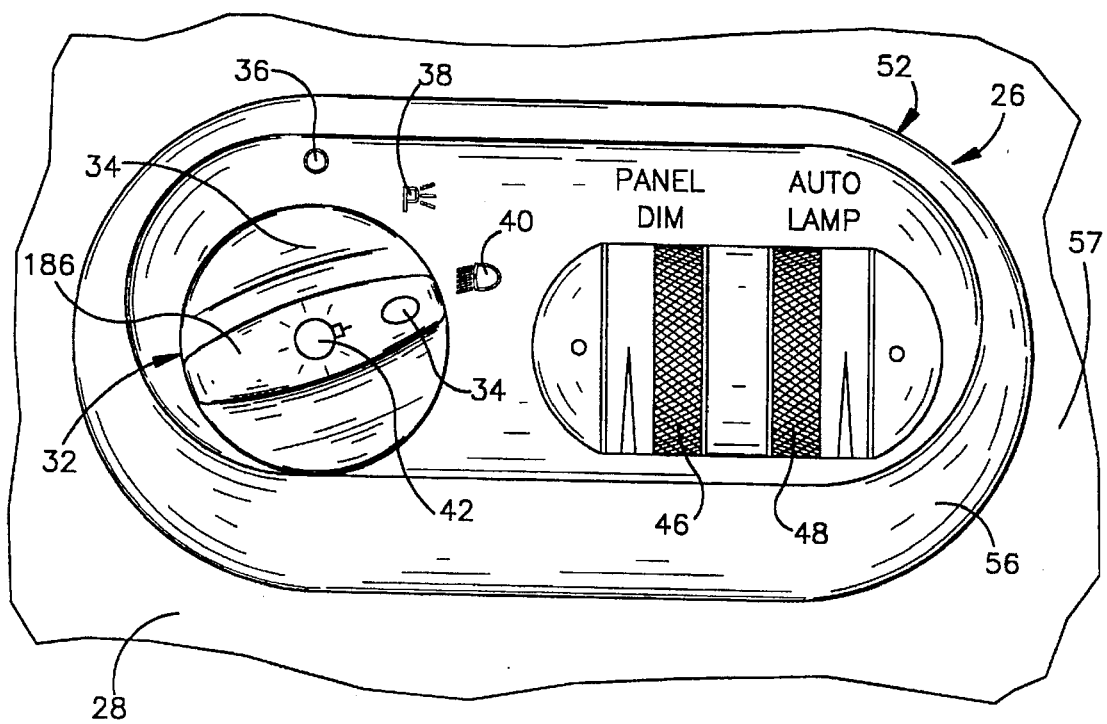
FIG. 3 is a plan view, generally similar to FIG. 2, illustrating the switch control assembly in an actuated condition.

The specific embodiment of the switch control assembly 26 illustrated in FIG. 2 includes a thumbwheel 46 which is manually rotatable to vary the brightness of lights on the instrument panel 28. In addition, a thumbwheel 48 is manually rotatable to vary the length of time which elapses between when the vehicle engine is turned off and the headlights become automatically de-energized. It should be understood that the thumbwheels 46 and/or 48 could be utilized to control different functions or could be eliminated if desired.

The switch control assembly 26 includes a housing 52 (FIG. 4) which encloses a known switch assembly 54. The housing 52 includes a bezel 56 which engages an outer side 57 of the instrument panel 28. The housing 52 also includes an array 58 of side walls which extends inward from the bezel 56.

Figure 6:
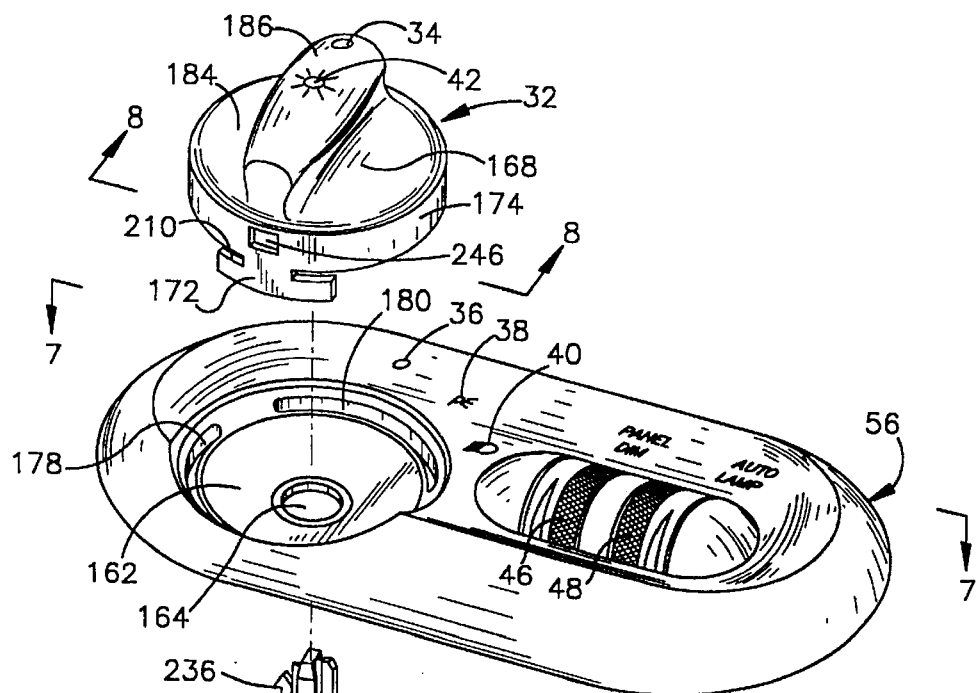
FIG. 6 is a simplified exploded perspective view of some of the components of the switch control assembly of FIG. 4.
Figure 6:
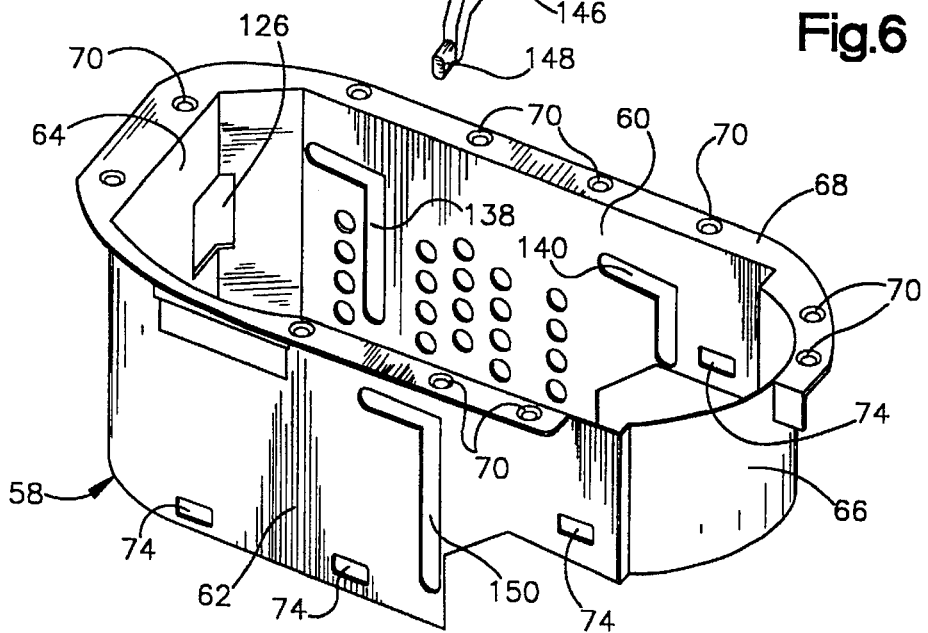

The array 58 of side walls includes parallel major side walls 60 and 62 (FIGS. 4 and 6) and minor side walls 64 and 66. The major side walls 60 and 62 and minor side walls 64 and 66 are integrally formed as a single piece with a rim portion 68 (FIG. 6). The rim portion 68 has openings 70 into which projections (not shown) on the underside of the bezel 56 extend. The array 58 of side walls is fixedly connected with the bezel 56 to form a unitary housing 52.

The switch assembly 54 (FIG. 4) is enclosed by the array 58 of side walls. Thus, the switch assembly 54 has a housing with tabs 72 which extend into openings 74 formed in the array 58 of side walls. This enables the housing 52 to position the switch assembly 54 in the instrument panel 28.

A latch assembly 78 (FIGS. 4, 6 and 14) retains the housing 52 in an opening 80 (FIG. 4) formed in the instrument panel 28. The latch assembly 78 is operable between the engaged condition shown in FIG. 4 in which the latch assembly is effective to retain the housing 52 in the instrument panel 28 and a disengaged condition (FIG. 16) in which the latch assembly is ineffective to retain the housing 52 in the instrument panel 28. When the latch assembly 78 is in the disengaged condition, the housing 52 and switch assembly 54 can be withdrawn from the instrument panel 28 through the opening 80.

The switch assembly 54 includes a rotatable switch actuator cam 84 (FIG. 5) which is enclosed by the housing 52. The rotatable switch actuator cam 84 has a cylindrical configuration and is disposed in a coaxial relationship 5 with the actuator member 32. The switch actuator cam 84 is rotatable about an axis 85 which extends through the actuator member 32.

Figure 4:
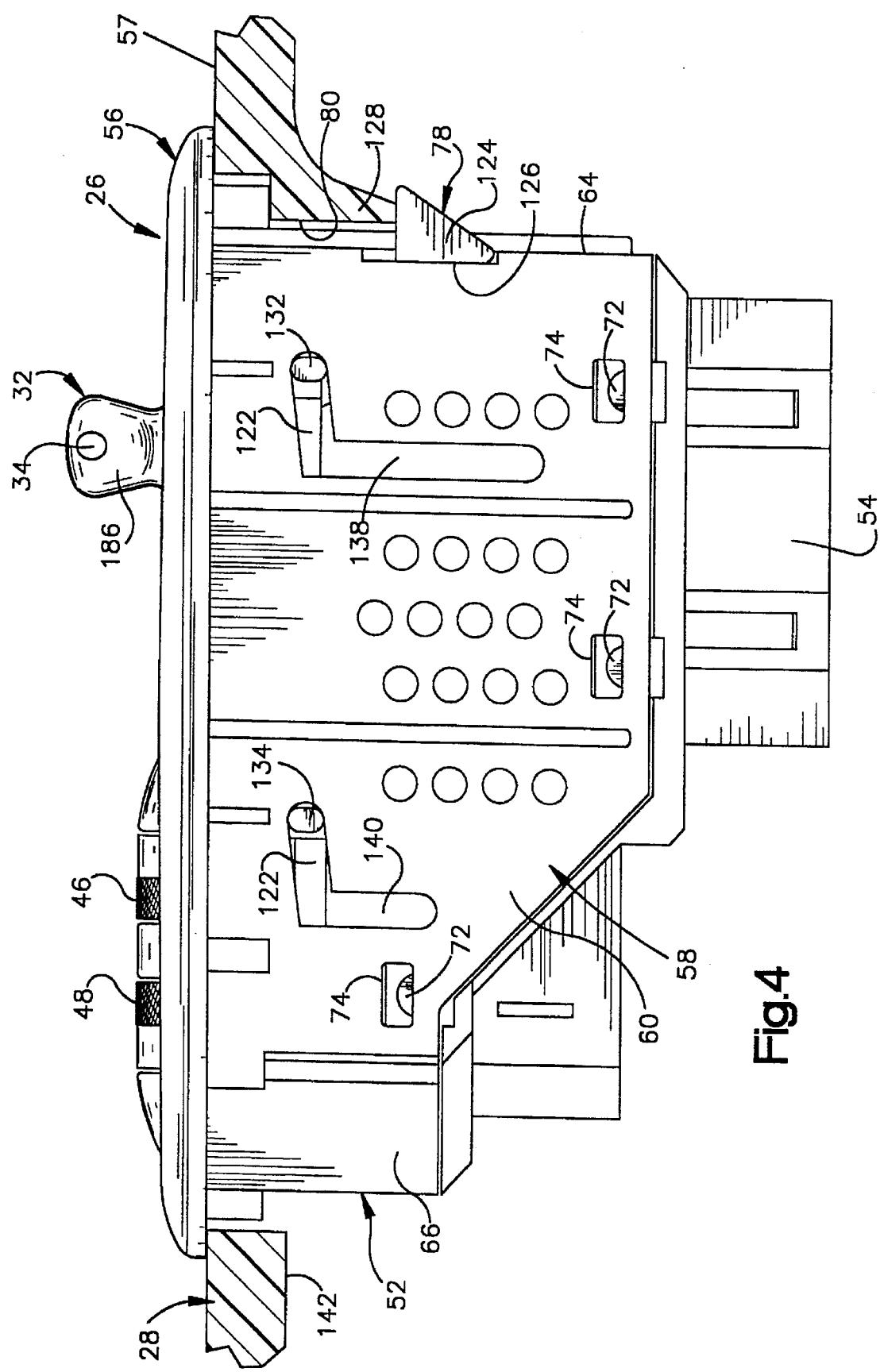
FIG. 4 is an elevational view, taken generally along the line 4—4 of FIG. 2, illustrating the manner in which the switch control assembly is mounted in an instrument panel of the vehicle.

A drive member 86 is connected with the switch actuator cam 84. The drive member 86 is disposed in a coaxial relationship with the switch actuator cam 84 and the actuator member 32. The drive member 86 is connected with and is rotatable by the actuator member 32 (FIGS. 2–4).

When the actuator member 32 is in the initial or off position (FIG. 2), a parking light control switch 90 (FIG. 5) is open so that parking lights 92 are de-energized. At this time, a headlight control switch 94 is also open so that headlights 96 are de-energized. In addition, a fog light control switch 98 is open so that fog lights 100 are de-energized.

Upon manual rotation of the actuator member 32 through approximately 27.5° in a clockwise direction about the axis 85 from the position shown in FIG. 2, the indicator 34 moves into alignment with the indicia 38 indicating that the parking lights 38 are energized. Rotation of the actuator member 32 is transmitted by the drive member 86 (FIG. 5) to the switch actuator cam 84. Rotation of the switch actuator cam 84 moves a movable switch contact 104 in the parking light control switch 90 into engagement with a stationary switch contact 105. This results in the parking lights 92 being energized. At this time, the headlights 96 and fog lights 100 are de-energized.

Upon continued clockwise manual rotation of the actuator member 32 through an additional 27.5° about the axis 85 to the position shown in FIG. 3, the indicator 34 moves into alignment with the indicia 40 indicating that the headlights are energized. As the actuator member 32 is moved to the position shown in FIG. 3, the switch actuator cam 84 (FIG. 5) is rotated about the axis 85 by the drive member 86. This moves a movable switch contact 106 in the headlight control switch 94 into engagement with a stationary switch contact 108 to close the headlight control switch. Closing the headlight control switch results in the headlights 96 being energized. At this time, the parking lights 92 are also energized. However, the fog lights 100 are de-energized.

To energize the fog lights 100, the actuator member 32 is first rotated about the axis 85 to the position shown in FIG. 3 to energize the parking lights 92 and headlights 96. Once this has been done, the actuator member 32 is pulled outward along the axis 85, that is, in a direction away from the switch assembly 54 (FIG. 4). This axially outward movement of the actuator member 32 moves the drive member 86 axially outward, that is upward as viewed in FIG. 5. During the axially outward movement of the drive member 86, the switch actuator cam 84 remains stationary.

As the drive member 86 is moved axially outward, a movable switch contact 112 in the fog light control switch 98 moves into engagement with a stationary switch contact 114 to energize the fog lights 100. This results in the parking lights 92, headlights 96 and fog lights 100 being energized.

When the vehicle lights are to be turned off, the actuator member 32 is first pushed axially inward toward the bezel 56 while the actuator member is in the position shown in FIG. 3. The drive member 86 moves axially inward with the actuator member 32 while the switch actuator cam 84 remains stationary. This results in the movable switch contact 112 in the fog light control switch 98 being moved away from the stationary switch contact 114 to de-energize the fog lights 100.

The actuator member 32 is then rotated in a counterclockwise direction from the position shown in FIG. 3. The switch actuator cam 84 is rotated with the actuator member 32 to move the movable switch contact 106 in the headlight control switch 94 away from the stationary switch contact 108 and de-energize the headlights 96. As this occurs, the indicator 34 moves into alignment with the parking light indicia 38.

Continued counterclockwise rotation of the actuator member 32 moves the actuator member to the initial or off position shown in FIG. 2. The switch actuator cam 84 is rotated with the actuator member 32 to move the movable switch contact 104 in the parking light control switch 90 away from the stationary switch contact 105 to de-energize the parking lights 92. As this occurs, the indicator 34 moves into alignment with the off position indicia 36 (FIG. 2). Thus, when the actuator member 32 is in the off position shown in FIG. 2, the parking lights 92, headlights 96 and fog lights 100 (FIG. 5) are all de-energized.

Housing and Latch Assembly

Figure 14:
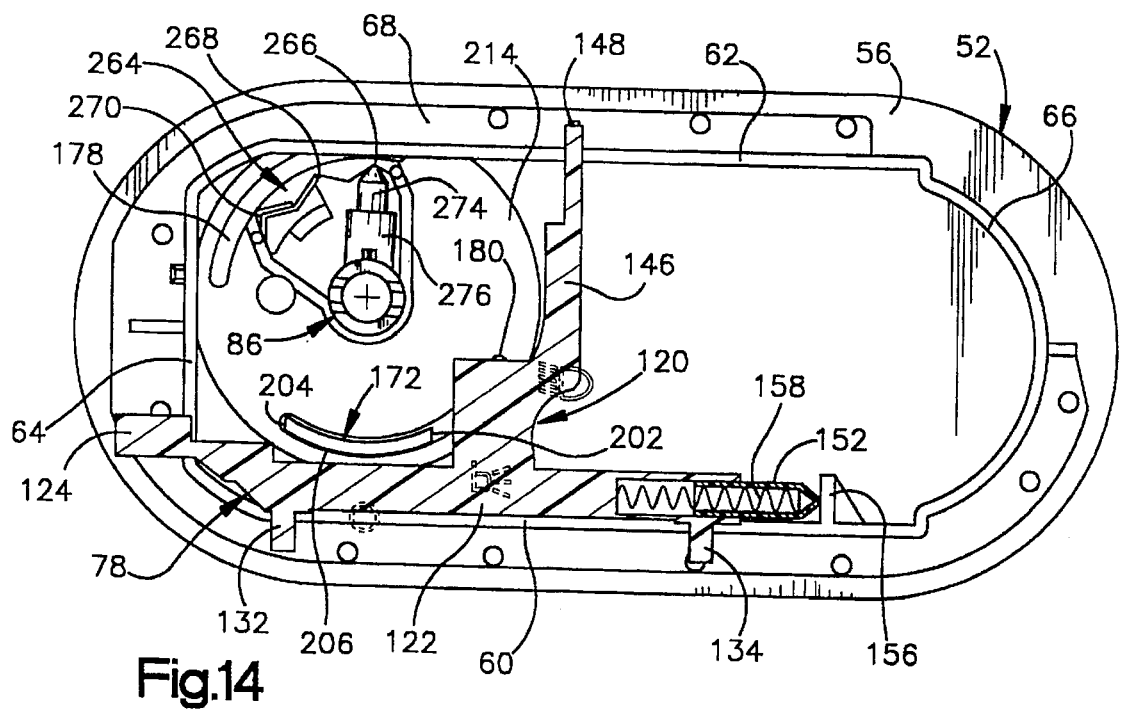
FIG. 14 is a schematicized plan view, generally similar to FIG. 11, of the inner side of the housing when a latch assembly is in an engaged condition and the actuator member is in the orientation shown in FIG. 13.

The housing 52 (FIG. 4) encloses the switch assembly 54 and the latch assembly 78. The latch assembly 78 includes a latch member 120 (FIGS. 6 and 14). Portions of the latch member 120 extend through openings in the housing 52 to engage the instrument panel 28 (FIG. 4).

The latch member 120 has a main body section 122 (FIG. 6). The main body section 122 of the latch member 120 extends along the major side wall 60 of the array 58 of side walls (FIGS. 6 and 14). The main body section 122 of the latch member 120 has an outwardly projecting latch pawl 124 which extends through an opening 126 in the side wall 64 (FIGS. 4 and 6).

When the latch assembly 78 is in the engaged condition of FIG. 4, the latch pawl 124 engages an inwardly projecting portion 128 of the instrument panel 28. The main body section 122 of the latch pawl has a pair of latch fingers 132 and 134 which extend outward from the main body section (FIGS. 4 and 6). The latch fingers 132 and 134 extend through openings 138 and 140 (FIG. 6) formed in the major side wall 60. The latch fingers 132 and 134 engage an inner side surface 142 (FIG. 4) of the instrument panel 28.

In addition, the latch member 120 (FIG. 6) includes an arm 146 which extends from the main body section 122. The arm 146 extends between the major side walls 60 and 62 of the housing 52 (FIG. 14). A latch finger 148 is formed on the outer end of the arm 146 and extends into an opening 150 formed in the major side wall 62 of the array of side walls 58 (FIG. 6).

A plunger 152 extends axially outward from the main body section 122. When the latch assembly 78 is in the engaged condition illustrated in FIG. 14, the plunger 152 is pressed against a projection 156 on the major side wall 62 of the array of side walls 58 by a biasing spring 158. The biasing spring 158 urges the latch member 120 toward the engaged condition.

Figure 16:
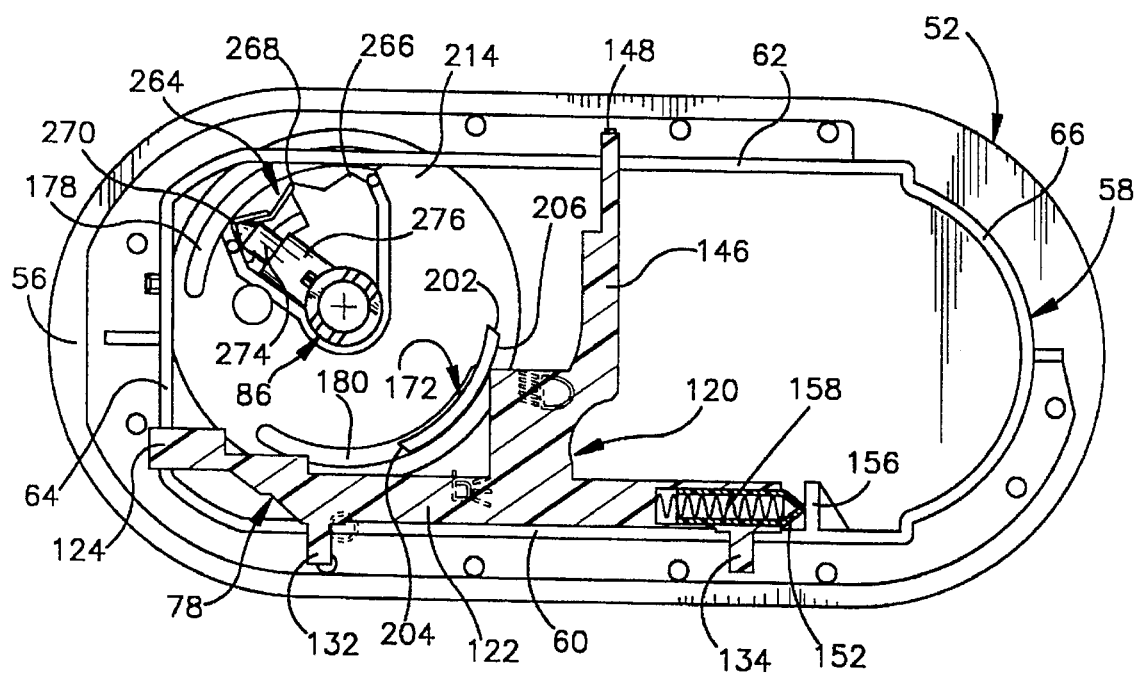
FIG. 16 is a schematicized plan view, taken generally along the line 16—16 of FIG. 15, further illustrating the relationship of the actuator member to the latch assembly when the latch assembly is in the disengaged condition.

The latch member 120 is movable rightward from the engaged condition of FIG. 14 to the disengaged condition of FIG. 16 against the influence of the biasing spring 158. The spring-loaded plunger 152 continuously urges the latch member 120 toward the left (as viewed in FIG. 14) and the engaged condition.

The bezel 56 has a circular recess 162 (FIGS. 6 and 7) which receives the actuator member 32 (FIG. 6). The circular recess 162 has a central opening 164 through which the drive member 86 extends. The drive member 86 extends through the opening 164 into engagement with a central portion 168 of the actuator member 32. The opening 164 in the circular recess 162 has a central axis which is coincident with the central axis 85 of the actuator member 32, drive member 86 and the switch actuator cam 84 (FIG. 5) in the switch assembly 54.

Indicia 36, 38 and 40 (FIG. 7) for indicating whether the parking lights and/or headlights are energized is disposed in an arcuate array along the periphery of the circular recess 162. The arcuate array of indicia 36, 38 and 40 has a center of curvature which is disposed on the central axis 85 (FIG. 6) of the opening 164.

In accordance with one of the features of the invention, the actuator member 32 has a latch actuator section 172. The latch actuator section 172 operates the latch assembly 78 from the engaged condition to the disengaged condition during rotation of actuator member 32. The latch actuator section 172 also applies force to the housing 52 to move the switch control assembly 26 relative to the instrument panel 28 when the latch assembly 78 is in the disengaged condition.

Figure 7:
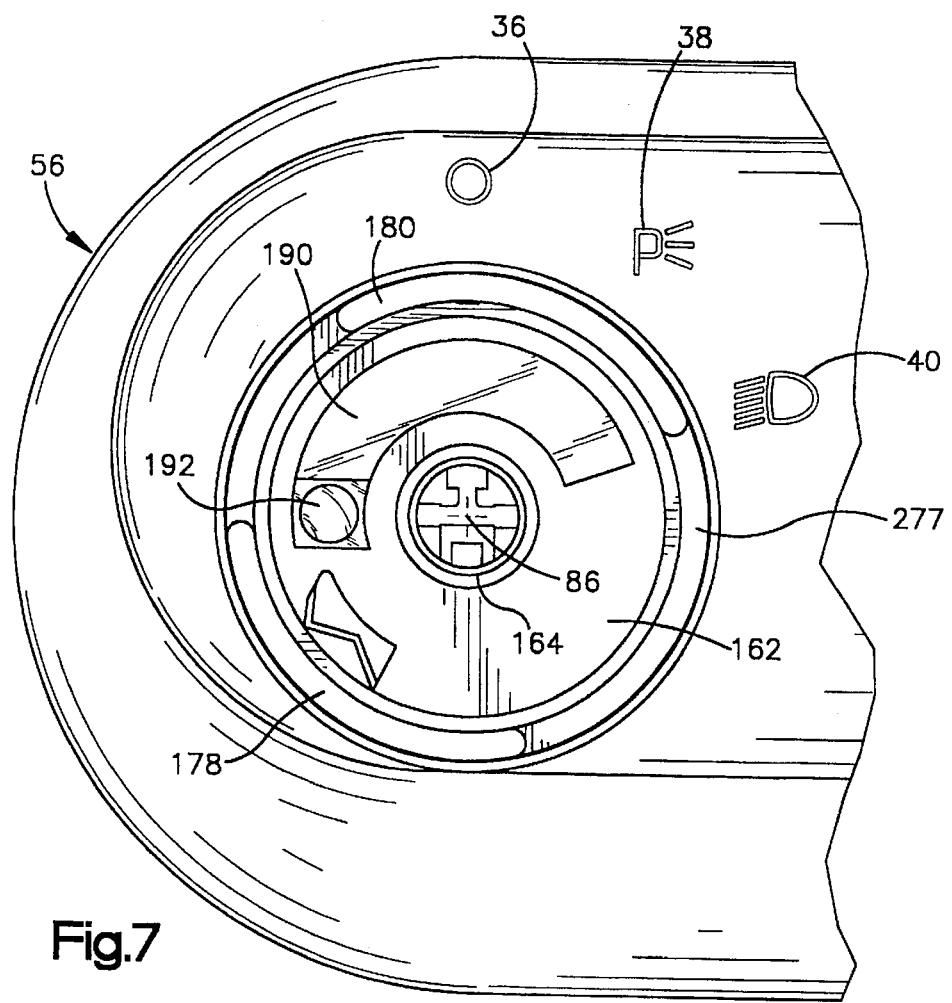
FIG. 7 is an enlarged plan view of a portion of a bezel which forms part of a housing which encloses the switch assembly of FIG. 5.
Figure 8:
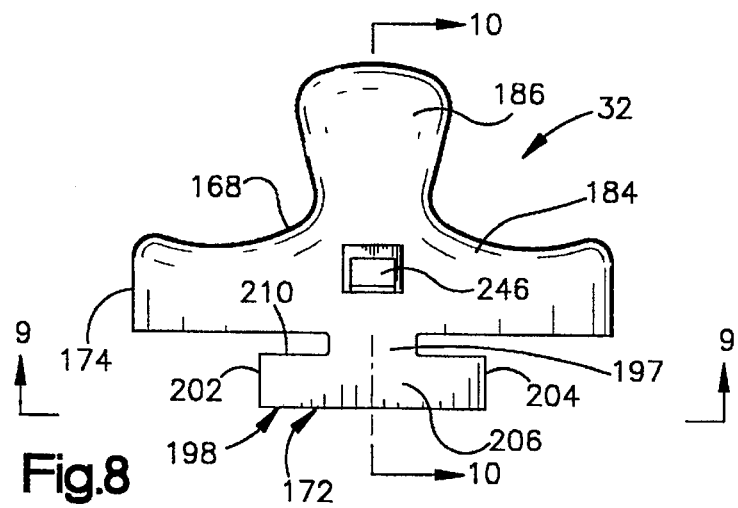
FIG. 8 is a side elevational view of an actuator member which is rotatable relative to the housing to actuate the switch assembly of FIG. 5.
Figure 9:
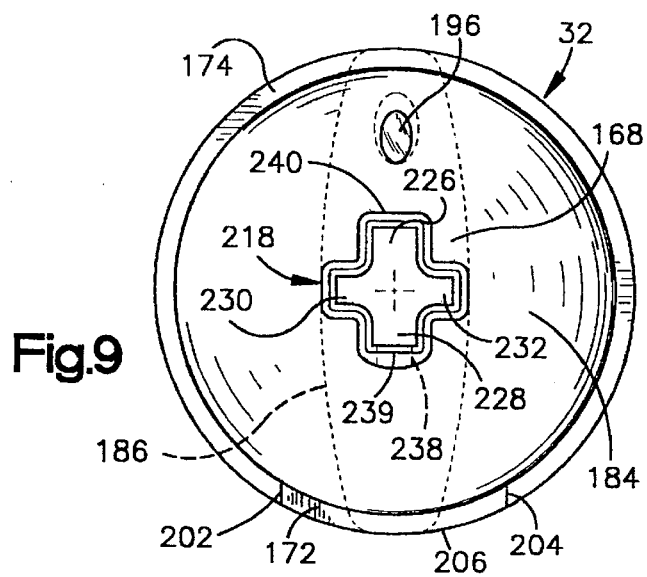
FIG. 9 is a bottom plan view, taken generally along the line 9—9 of FIG. 8, further illustrating the construction of the actuator member.

The latch actuator section 172 extends axially outward from a cylindrical rim portion 174 of the actuator member (FIGS. 6, 8 and 9). The cylindrical rim portion 174 of the actuator member 32 is received in the circular recess 162 in the bezel 56 (FIG. 7). The cylindrical rim portion 174 of the actuator member 32 has a center of curvature which is disposed on the coincident central axes 85 of the opening 164 and actuator member.

When the actuator member 32 is in its normal orientation relative to the bezel 56 (FIGS. 2 and 3), the latch actuator section 172 of the actuator member extends into an arcuate storage slot 178 (FIG. 7) in the bezel 56. The arcuate storage slot 178 has a center of curvature which is disposed on the axis 85. When the latch actuator section 172 is disposed in the arcuate storage slot 178, the latch actuator section 172 is ineffective to operate the latch assembly 78. Thus, when the latch actuator section 172 is disposed in the storage slot 178, rotation of the actuator member 32 is ineffective to move the latch member 120 against the influence of the biasing spring 158 (FIG. 14). However, rotation of the actuator member 32 with the latch actuator section 172 disposed in the storage slot 178 is effective to actuate the switch assembly 54.

Figure 13:
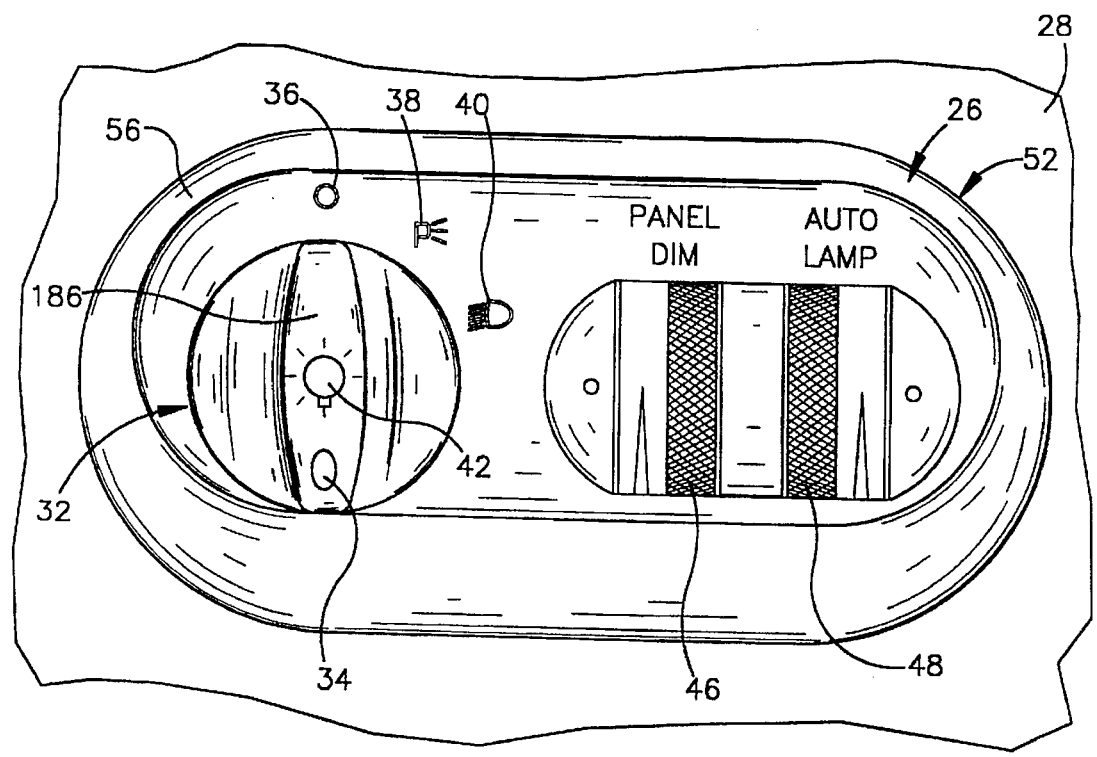
FIG. 13 a plan view, generally similar to FIGS. 2 and 3, illustrating the manner in which the orientation of the actuator member is changed when the switch control assembly is to be removed from the instrument panel.

When the orientation of the actuator member 32 relative to the bezel 56 is changed to the orientation shown in FIG. 13, the latch actuator section 172 extends into a latch release slot 180 (FIG. 7). When the actuator member 32 is in this orientation, the latch actuator section 172 is effective to actuate the latch assembly 78 from the engaged condition to the disengaged condition upon rotation of the actuator member. The arcuate storage slot 178 and latch release slot 180 have a common center of curvature which is disposed on the central axis 85 of the opening 164. Rotation of the actuator member 32 with the latch actuator section 172 disposed in the latch release slot 180 is also effective to actuate the switch assembly 54.

In the specific embodiment of the invention illustrated in FIG. 7, the storage slot 178 has an arcuate extent of approximately 99° and the latch release slot 180 has an arcuate extent of approximately 103°. The arcuate distance between the left (as viewed in FIG. 7) end of the storage slot 178 and the left end of the latch release slot 180 is approximately 62°. The arcuate distance between the right (as viewed in FIG. 7) end of the storage slot 178 and right end of the latch release slot 180 is approximately 96°.

The specific embodiment of the bezel 56 illustrated in FIG. 7 was integrally molded as one piece of clear polycarbonate and had an outer side surface painted white and then black. The black layer being laser etched to expose indicia 36, 38 and 40, a light pipe 190 being maintained clear. It should be understood that the foregoing arcuate extents for the storage slot 178 and latch release slot 180 and specific materials have been set forth herein for purposes of clarity of description. It is contemplated that other embodiments of the invention may be constructed differently.

Actuator Member and Drive Member

The actuator member 32 and the drive member 86 (FIGS. 5 6, 8, 9 and 10) transmit force to actuate the switch assembly 54 (FIG. 5) upon manual rotation of the actuator member relative to the bezel 56 (FIG. 7). The actuator member 32 (FIG. 8) includes a circular body portion 184 (FIGS. 8 and 9) which includes the central portion 168 of the actuator member 32. The cylindrical rim portion 174 extends axially inward from the body portion 184. A handle portion 186 extends outward from the body portion 184 and extends diametrically across the body portion.

The indicator 34 (FIG. 6) is disposed on the handle portion 186 along with the fog light indicia 42. The indicator 34 is translucent. A light pipe system is provided to conduct light to the indicator 34. The light pipe system includes the transparent arcuate light pipe 190 (FIG. 7) which is formed on the bezel 56. The light pipe 190 is exposed to a light source located in the housing inward of an end portion 192 of the light pipe 190.

The actuator member 32 is provided with a transparent light pipe 196 (FIGS. 9 and 10) which leads to the indicator 34. The transparent light pipe 196 on the actuator member 32 moves along the arcuate light pipe 190 (FIG. 7) at the bottom of the recess 162 in the bezel 56 during rotation of the actuator member 32 relative to the bezel. Therefore, light is conducted through the light pipe system to the indicator 34 when the instrument panel lights are energized and the indicator 34 is aligned with any one of the indicia 36, 38 or 40 (FIG. 7).

The latch actuator section 172 (FIGS. 8 and 10) extends axially inward from the cylindrical rim portion 174 of the actuator member 32. The latch actuator section 172 has an arcuate configuration with the same radius of curvature as the rim portion 174 of the actuator member 32 (FIG. 9). Therefore, the center of curvature of the arcuate latch actuator section 172 is disposed on the coincident central axes 85 of the actuator member 32 and the circular opening 164 (FIG. 7) in the bezel 56 when the actuator member 32 is disposed in the circular recess 162.

The latch actuator section 172 includes a connector portion 197 which extends axially inward from the rim portion 174. A main portion 198 extends circumferentially along the rim portion 174 in opposite directions from the connector portion 197. The main portion 198 of the latch actuator section 172 has an end surface 202 (FIG. 8) which is engageable with the latch assembly 78 (FIG. 14) to operate the latch assembly. The opposite end 204 (FIG. 8) on the latch actuator section 172 is used to operate a latch assembly when the switch control assembly 26 (FIG. 1) is disposed in a righthand drive vehicle rather than the lefthand drive vehicle described herein.

Figure 15:
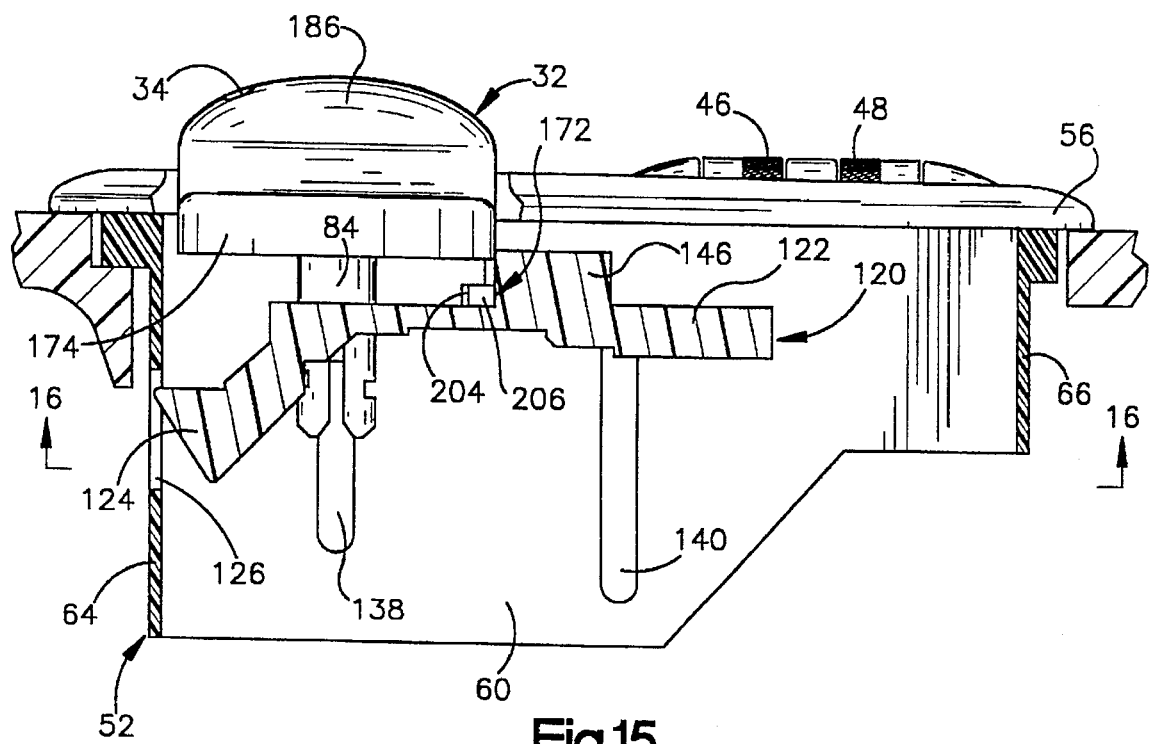
FIG. 15 is a schematicized elevational view depicting the relationship of the actuator member to a latch member in the latch assembly when the latch assembly is in a disengaged condition.

In addition, the main portion 198 of the latch actuator section 172 has an arcuate outer side surface 206 (FIG. 8). The arcuate outer side surface 206 retains the latch assembly 78 in the disengaged condition (FIGS. 15 and 16). The main portion 198 of the latch actuator section 172 also has an arcuate force transmitting surface 210. The force transmitting surface 210 faces toward the rim portion 174 and has the same radius of curvature as the rim portion.

When the latch assembly 78 is in the disengaged condition, the force transmitting surface 210 is engageable with an inner side surface 214 (FIG. 11) on the bezel 56. This enables the actuator member 32 to be pulled axially outward to apply force to the housing 52 (FIG. 4). The force applied to the housing 52 upon manual pulling of the actuator member 32 with the latch assembly 78 disengaged is effective to move the switch control assembly 26 relative to the instrument panel 28.

The entire actuator member 32 is integrally molded as one piece of material. Thus, the latch actuator section 172, rim portion 174 and handle portion 186 of the actuator member 32 are molded as one piece. In one specific embodiment of the invention, the actuator member 32 was integrally molded as a single piece of clear polycarbonate. The outer side surface of the actuator member was painted white and then black, the black layer being laser etched to expose the indicia 34 and indicia 42 (FIG. 2). Of course, the actuator member 32 could be formed of a different material and in a different manner if desired.

In the specific embodiment of the invention previously referred to and having the bezel 56 illustrated in FIG. 7, the main portion 198 (FIG. 8) of the latch actuator section 172 had an arcuate extent of approximately 60°. The connector portion 197 had an arcuate extent of approximately 24°. In this one specific embodiment of the invention, the connector portion 197 had an axial extent of approximately 1.8 millimeters and the main portion 198 had an axial extent of approximately 4.2 millimeters. It should be understood that the foregoing specific dimensions and materials for the actuator member 32 (FIG. 8) and bezel 56 (FIG. 7) have been set forth herein for purposes of clarity of description and it is contemplated that other embodiments of the invention may be constructed differently.

A socket 218 (FIGS. 9 and 10) is formed in the central portion 168 of the actuator member 32 and cooperate with the drive member 86 to form a plug and socket connection with the drive member. The socket 218 has a central axis which is coincident with the central axis 85 of the actuator member 32. The socket 218 telescopically receives an outer end or insert portion 222 (FIG. 10) of the drive member 86. The socket 218 has opposite end portions 226 and 228 (FIG. 9) which have the same configuration and size. In addition, the socket 218 has a pair of opposite end portions 230 and 232 which have the same configuration and size. However, the end portions 230 and 232 are smaller than the end portions 226 and 228.

The outer end portion 222 of the drive member 86 has a cross sectional configuration which is the same as the configuration of the socket 218. Since the socket 218 is symmetrical, the end portion 222 (FIG. 10) of the drive member 86 may be telescopically inserted into the socket when the socket is in either one of two orientations relative to the drive member 86. Thus, the end portion 222 of the drive member 86 may be telescopically inserted into the socket 218 when the drive member is in the orientation shown in FIG. 10. The end portion 222 of the drive member 86 may also be inserted into the socket 218 when the actuator member 32 and socket 218 are offset by 180° from the orientation shown in FIG. 10 relative to the drive member 86.

The end portion 222 of the drive member 86 has a resiliently deflectable retainer 236 (FIG. 10) which is engageable with a rectangular opening 238 in a side wall 239 of the socket 218. When the actuator member 32 is offset by 180° from the position shown in FIG. 10, the resilient retainer 236 is disposed adjacent to the opposite side wall 240 of the socket which does not have an opening. Therefore, the resilient retainer 236 can not engage the side wall 240 and retain the actuator member 32 on the end portion 222 of the drive member 86.

When the actuator member 32 is disposed in the orientation shown in FIGS. 2 and 3 relative to the bezel 56, the indicator 34 is adjacent to a selected one of the indicia 36, 38 or 40. At this time, the retainer 236 (FIG. 10), engages the opening 238 in the side wall 239 of the socket 218 to hold the actuator member 32 in telescopic engagement with the drive member 86. When the actuator member 32 is disposed in the orientation shown in FIG. 13, the retainer 236 engages the side wall 240 and is ineffective to prevent pulling of the actuator member 32 off of the end portion 222 of the drive member 86.

Figure 10:
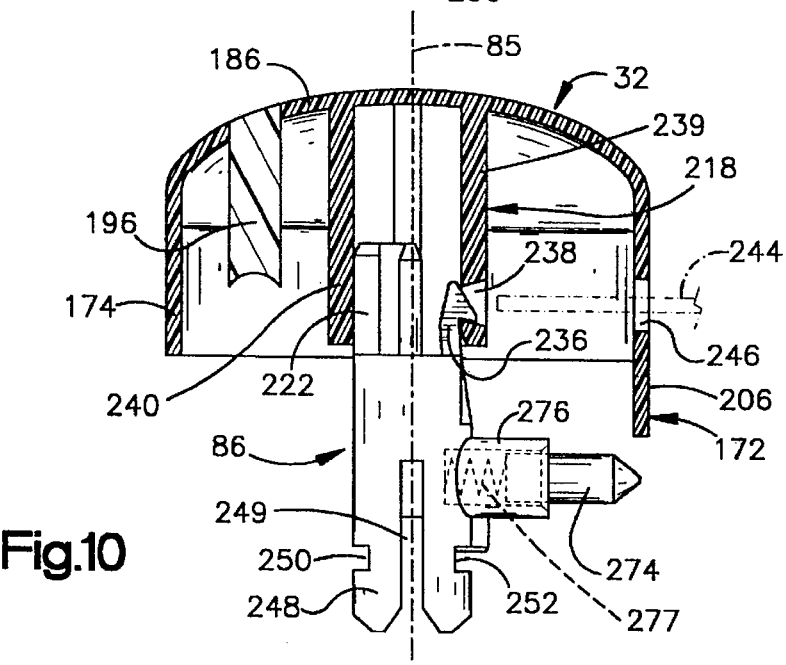
FIG. 10 is a fragmentary sectional view, taken generally along the line 10—10 of FIG. 8, illustrating the manner in which the actuator member is connected with a drive member.

To disconnect the actuator member 32 from the drive member 86 when the retainer 236 is in engagement with the opening 238 (FIG. 10), a tool 244 is insertable through a tool access opening 246 (FIGS. 8 and 10) formed in the rim portion 174 of the actuator member 32. When the actuator member 32 is connected with the drive member 86 and is disposed in the circular recess 162 (FIG. 7) in the bezel 56, the tool access opening 246 is blocked by the bezel (FIG. 4). However, upon pulling of the actuator member 32 axially outward relative to the bezel 56 when the actuator member is in the position shown in FIG. 3 in order to effect energization of the fog lights 100 (FIG. 5), the tool access opening 246 moves outward of the circular recess 162. The tool 244 can then be inserted through the tool access opening 246 and into the opening 238 to engage the retainer 236 (FIG. 10).

Figure 5:
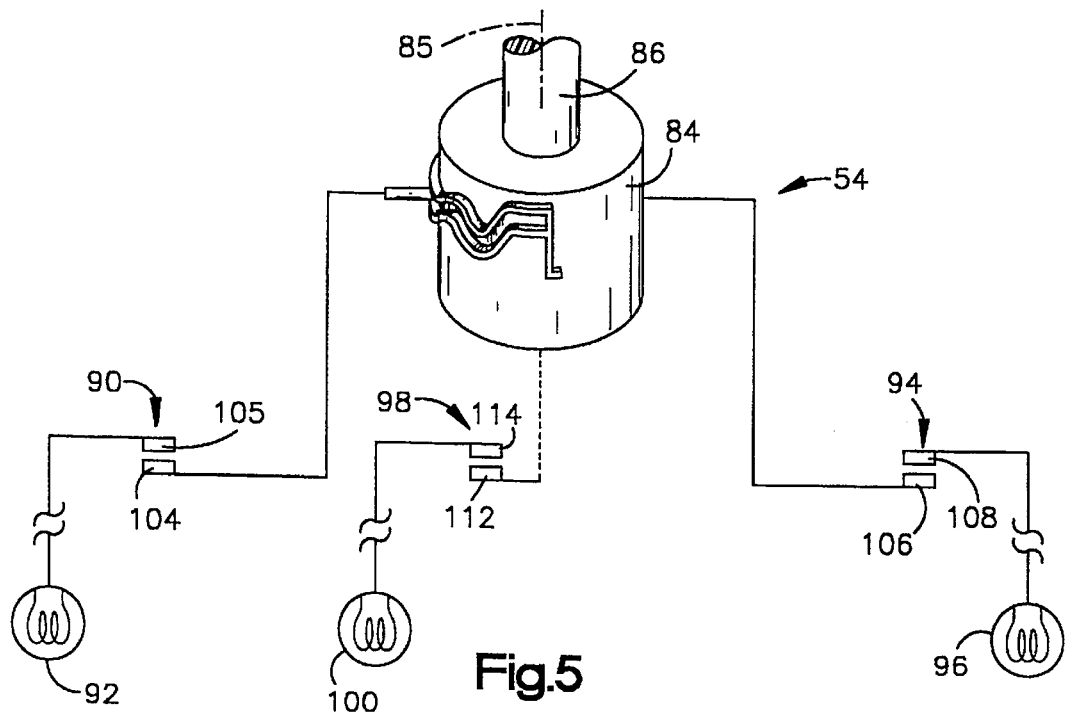
FIG. 5 is a schematic pictorial illustration of a switch assembly which forms a portion of the switch control assembly of FIG. 4.

The drive member 86 has an inner end portion 248 (FIG. 10) with an axially extending slot 249 which engages projections on the rotatable switch actuator cam 84 (FIG. 5). Upon rotation of the actuator member 32, force is transmitted through the socket 218 to the outer end portion 222 of the drive member 86 to rotate the drive member and the switch actuator cam 84 relative to the housing 52. However, the slot 249 in the drive member 86 is movable in an axial direction relative to the housing 52 without moving the switch actuator cam 84. Therefore, the drive member 86 can only rotate the switch actuator cam 84 and can not move the switch actuator cam axially.

The inner end portion 248 of the drive member 86 also includes a pair of radially extending slots 250 and 252 (FIG. 10) which are connected with the fog light control switch 98. After the actuator member has been rotated to the headlight energized position shown in FIG. 3, the actuator member 32 can be pulled axially outward relative to the bezel 56. As the actuator member 32 is pulled axially outward, force is transmitted from the socket through the retainer 236 to the drive member 86 to pull the drive member axially outward. As the drive member 86 is pulled axially outward, the fog light control switch 98 is actuated from the open condition of FIG. 5 to the closed condition to effect energization of the fog lights 100. As the actuator member 32 is pulled outward to effect energization of the fog lights 100 (FIG. 5), switch actuator cam 84 (FIG. 5) is stationary.

Once the actuator member 32 has been pulled outward to effect energization of the fog lights 100, the actuator member may be disconnected from the drive member 86. Thus, as the actuator member 32 is pulled outward to effect energization of the fog lights 100, the tool access opening 246 (FIGS. 8 and 10) moves outward of the circular recess 162 (FIG. 7) in the bezel 56. Once this has occurred, the tool 244 can be inserted through the tool access opening 246 into engagement with the retainer 236. The tool 244 is then pushed axially inward to resiliently flex the retainer 236 toward the left (as viewed in FIG. 10) and disengage the retainer from the opening 238 in the side wall 239 of the socket 218. Once the retainer 236 has been disengaged from the opening 238 in the side wall 239 of the socket 218, the actuator member 32 can be pulled outward to disengage the actuator member from the outer end portion 222 of the drive member 86.

Index Assembly

An index assembly 260 (FIGS. 11 and 12) is mounted on the inner side of the bezel 56. The index assembly 260 is connected with the actuator member 32 through the drive member 86. The index assembly 260 functions to maintain the actuator member 32 in a position to which it is manually rotated relative to the bezel 56 during actuation of the switch assembly 54.

Figure 11:
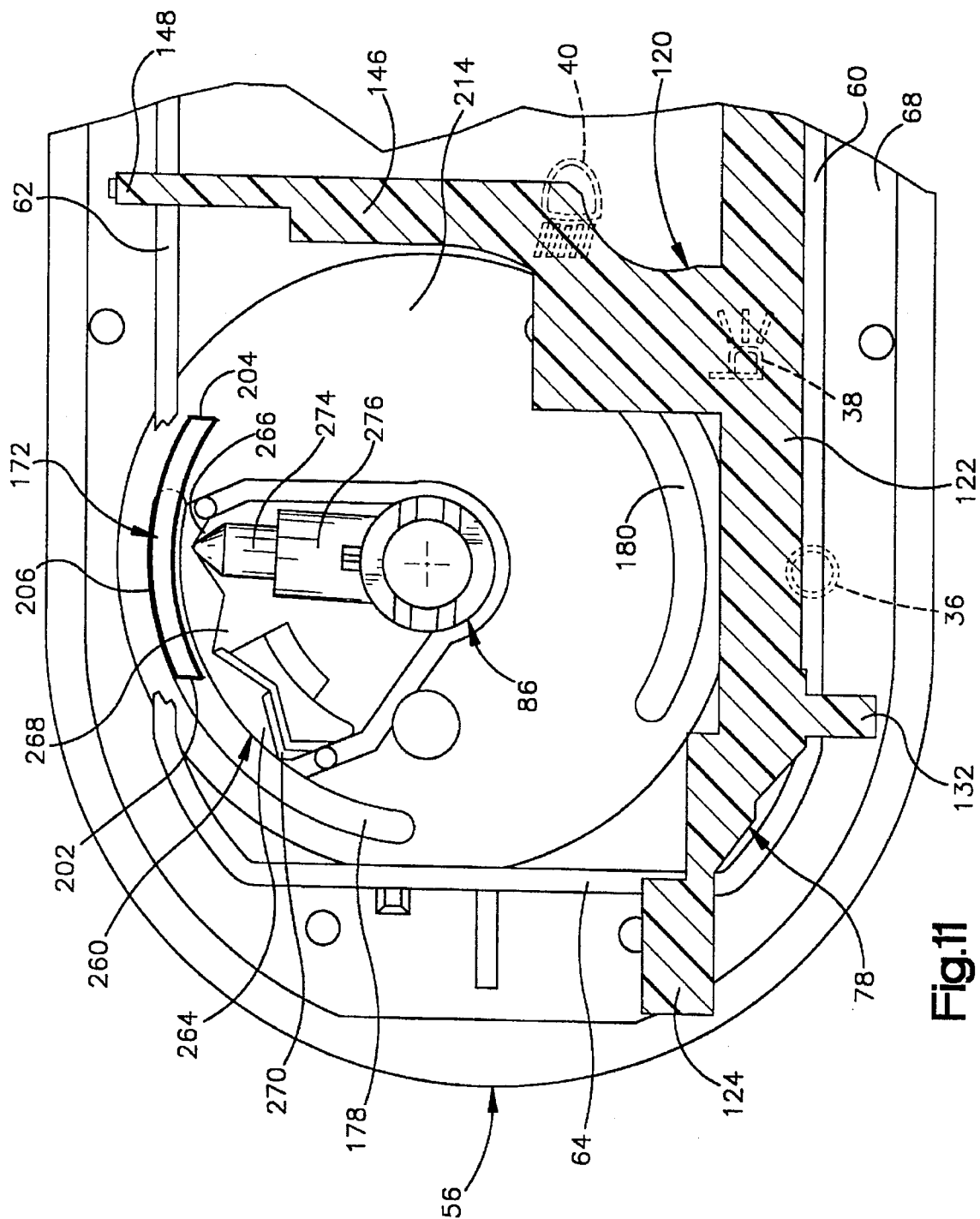
FIG. 11 is an enlarged plan view of a portion of an inner side of the housing with the switch control assembly in the unactuated condition of FIG. 2.

The index assembly 260 is disposed beneath the bezel 56 at a location which is offset by 180° from the indicia 36, 38 and 40 (FIGS. 6 and 7) on the bezel. Thus, the indicia 36, 38 and 40 is disposed on the outer side of the 5 bezel 56 along the arcuate latch release slot 180 in the bezel. The index assembly 260 is disposed on the inner side of the bezel 56 adjacent to the arcuate storage slot 178 in the bezel (FIG. 11).

Figure 12:
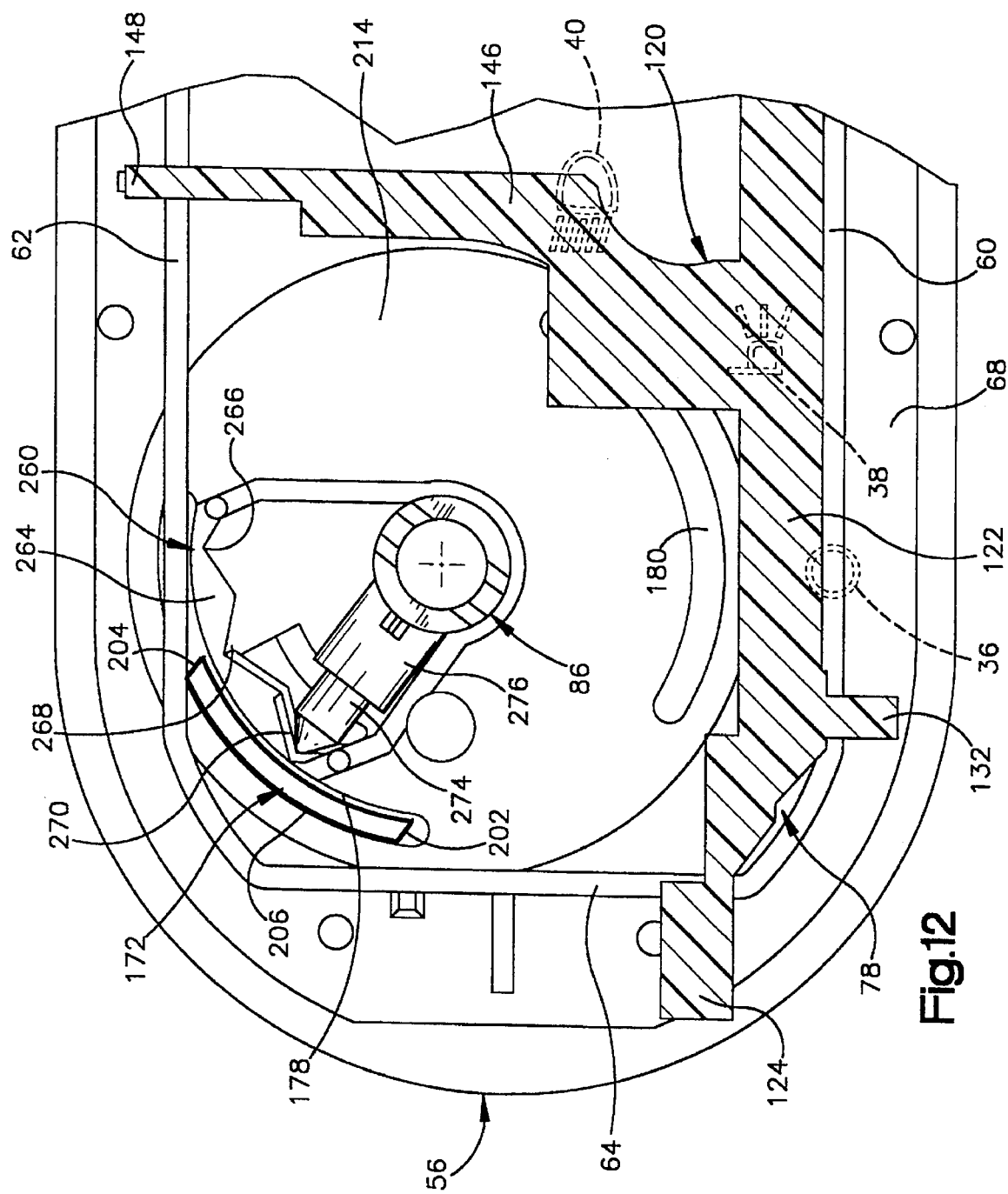
FIG. 12 is a plan view, generally similar to FIG. 11, of a portion of the inner side of the housing with the switch control assembly in the actuated condition of FIG. 3.

The index assembly 260 includes a stationary index plate or panel 264 (FIGS. 11 and 12) which has an arcuate configuration. A radially inner side of the index plate or panel 264 has V-shaped notches 266, 268, and 270. A cylindrical index plunger 274 (FIGS. 10, 11 and 12) is telescopically disposed in an arm section 276 of the drive member 86. A biasing spring 277 (FIG. 10) urges the index plunger 274 to move axially outward relative to the arm section 276 into engagement with any one of the notches 266, 268 or 270 (FIGS. 11 and 12). The arm section 276 of the drive member 86 is aligned with the handle portion 186 (FIGS. 8 and 10) of the actuator member 32. The index plunger 274 and arm section 276 on the drive member 86 point in the opposite direction from the indicator 34 (FIG. 2) on the actuator member 32.

Upon rotation of the actuator member 32 and drive member 86 relative to the bezel 56, the arm 276 on the drive member and the index plunger 274 are moved along an arcuate path having a central axis which is coincident with a central axis of the actuator member. When the actuator member 32 is in the off position in which the parking lights, headlights and fog lights are de-energized (FIG. 2), the index plunger 274 (FIG. 11) engages the first index position or notch 266. When the actuator member 32 is rotated through 27.5° to effect energization of the parking lights, the index plunger 274 and arm section 276 of the drive member 86 move into alignment with the second index position or notch 268. When the actuator member 32 is rotated through an additional 27.5° to the position in which the headlights are energized (FIG. 3), the index plunger 274 and arm section 276 on the drive member 86 are aligned with the third index position 270 (FIG. 12).

The third index position 270 has a relatively large axial extent. Therefore, when the index plunger 274 is disposed in engagement with the third index position 270, the drive member 86 can be moved axially in a direction toward the inner side surface 214 of the bezel 56 to move the index plunger 274 along the third index position. As this occurs, the fog light control switch 98 (FIG. 5) is actuated by the drive member 86 to energize the fog lights 100.

In the one specific embodiment of the invention previously referred to and illustrated in FIGS. 7 and 8, the connector portion 197 (FIG. 8) of the actuator member 32 has an axial extent of approximately 1.8 millimeters. In this specific embodiment of the invention, the circular recess 162 (FIG. 7) has an annular bottom wall section 277 in which the storage slot 178 and latch release slot 180 are formed. The annular bottom wall section 277 has a thickness of approximately 1.25 millimeters. This enables a portion of the bottom wall section 277 to be received in space between the rim portion 174 and the main portion 198 of the latch actuator section 172 when the latch actuator section is in either the position shown in FIG. 11 or the position shown in FIG. 16. It should be understood that the foregoing specific dimensions for the bezel 56 and actuator member 32 have been set forth herein for purposes of clarity of description and it is contemplated that other embodiments of the invention may be constructed differently.

Operation

The latch assembly 78 (FIGS. 4 and 14) retains switch control assembly 26 in the instrument panel 28 when the latch assembly is in the engaged condition. At this time, the actuator member 32 can be manually rotated relative to the bezel 56 between the off position shown in FIG. 2 and the headlight energize position shown in FIG. 3. When the actuator member 32 is in the off position shown in FIG. 2, the parking lights 92, headlights 96 and fog lights 100 (FIG. 5) are de-energized.

When the actuator member 32 is in the off position, the index plunger 274 (FIG. 11) engages the first index position 266 on the index plate or panel 264 to hold the actuator member in the off position. At this time, the latch actuator section 172 extends through the storage slot 178 adjacent to the index assembly 260. A portion of the annular bottom wall section 277 (FIG. 7) is disposed between the main portion 198 (FIG. 8) of the latch actuator section 172 and the rim portion 174 of the actuator member 32.

When the parking lights 92 are to be energized, the actuator member 32 is rotated in a clockwise direction from the position shown in FIG. 2 to move the indicator 34 into alignment with the parking light indicia 38. Rotation of the actuator member 32 rotates the switch actuator cam 84 (FIG. 5). Rotation of the switch actuator cam 84 operates the parking light control switch 90 to energize the parking lights 92.

Upon initiation of rotation of the actuator member 32 to energize the parking lights 92, the arm section 276 (FIG. 11) on the drive member 86 and the index plunger 274 are rotated in a counterclockwise direction (as viewed in FIG. 11). This results in the index plunger 274 being forced telescopically into the arm section 276 against the influence of the spring 277 (FIG. 10) as the index plunger moves out of the first index position 266. During continued counterclockwise rotation (as viewed in FIG. 11) of the drive member 86, the index plunger 274 moves out of the arm section 276 into engagement with the second index position 268. Therefore, when the actuator member 32 has been rotated to move the indicator 34 into alignment with the parking light indicia 38 (FIG. 2), the index plunger 274 will have moved into engagement with the second index position 268 to retain the actuator member in the parking light energized position.

When the headlights 96 are to be energized, the actuator member 32 is rotated to the position shown in FIG. 3 with the indicator 34 aligned with the headlight indicia 40. As this occurs, the drive member 86 (FIG. 12) is rotated to move the arm section 276 and index plunger 274 into alignment with the third index position 270. The index plunger 274 is resiliently pressed against the index position 270 in the index plate 264 to hold the drive member 86 and actuator member 32 against rotation relative to the bezel 56. At this time, the switch actuator cam 84 will have been rotated to effect actuation of the headlight control switch 94 to energize both the parking lights 92 and headlights 96.

If the fog lights 100 are to be energized, the actuator member 32 is manually pulled axially outward. As the actuator member 32 is pulled outward, force is transmitted through the retainer 236 (FIG. 10) to the drive member 86 to pull the drive member axially outward. As the drive member 86 is pulled axially outward, the arm section 276 (FIG. 12) and index plunger 274 are moved axially along the third index position 270 toward the inner side surface 214 of the bezel 56. The axially outward movement of the drive member 86 results in the movable switch contact 112 in the fog light control switch 98 (FIG. 5) being moved axially outward into engagement with the stationary switch contact 114 to energize the fog lights 100.

As the actuator member 32 is rotated in the manner previously explained to effect sequential energization of the parking lights and headlights, the latch actuator section 172 moves along the storage slot 178 from the position shown in FIG. 11 to the position shown in FIG. 12. As this movement occurs, the latch actuator section 172 is spaced from the latch assembly 178 and is ineffective to operate the latch assembly. Therefore, the latch assembly 78 remains in the engaged condition shown in FIGS. 4, 11 and 12. The engaged latch assembly 78 holds the housing 52 (FIG. 4) against movement relative to the instrument panel 28.

When the housing 52 and switch assembly 54 (FIG. 4) are to be removed from the instrument panel 28 for replacement, repair or other purposes, the actuator member 32 is used to operate the latch assembly 78 to a disengaged condition. Once the latch assembly 78 has been operated to a disengaged condition, the actuator member 32 is manually pulled axially outward to at least partially pull the housing 52 through the opening 80 in the instrument panel 28. Thus, the actuator member 32 is utilized to perform the dual functions of operating the latch assembly 78 to the disengaged condition and of transmitting force to the housing 52 to pull the housing from the instrument panel 28 while the latch assembly is in the disengaged condition.

To remove the housing 52 from the instrument panel 28, the actuator member 32 is rotated to the headlight energized position of FIG. 3. The actuator member 32 is then pulled axially outward to the fog light energized position. As the actuator member 32 is pulled axially outward to the fog light energized position, the tool access opening 246 (FIGS. 8 and 10) in the rim portion 174 of the actuator member 32 moves out of the recess 162 (FIG. 7) in the bezel 56.

The tool 244 (FIG. 10) is then inserted through the tool access opening 246. Axial force transmitted through the tool 244 resiliently deflects the retainer 236 out of engagement with the opening 238 in the side wall 239 of the socket 218. The actuator member 32 is then pulled manually outward and the socket 218 moved out of telescopic engagement with the end portion 222 of the drive member 86.

Once the actuator member 32 has been disengaged from the drive member 86, the actuator member is rotated through 180° relative to the end of the drive member. This results in the indicator 34 pointing in a direction opposite from the headlight indicia 40. Thus, the actuator member is offset by 180° from the position shown in FIG. 3. At this time, the index plunger 274 is disposed in engagement with the third index position 270 and the indicator member is disposed directly outward of, that is above as viewed in FIGS. 4 and 10, the index plunger 274.

The actuator member is pushed back onto the outer end portion 222 of the drive member 86. However, at this time, the latch actuator section 172 engages the annular bottom wall section 277 (FIG. 7) of circular recess 162 in the bezel 56. The latch actuator section 172 engages the annular bottom wall section 277 at a location which is disposed clockwise (as viewed in FIG. 7) from the right end of the latch release slot 180. This interference between the latch actuator section 172 and the bezel 56 partially blocks telescopic engagement of the socket 218 (FIG. 9) with the outer end portion 222 of the drive member 86 (FIG. 10). However, the partial telescopic engagement of the socket 218 with the outer end portion 222 of the drive member 86 is sufficient to enable the actuator member 32 to be used to rotate the drive member 86 in a counterclockwise direction (as viewed in FIG. 7).

The actuator member 32 is rotated until it reaches the position shown in FIG. 13. At this time, the end portion of the actuator member handle 186 opposite from the indicator 34 is aligned with the off position indicia 36. The index plunger 274 has moved into engagement with the first index position 266 in the manner shown in FIG. 14.

The latch actuator section 172 of the actuator member 32 is aligned with the latch release slot 180 (FIG. 14). The latch actuator section 172 is offset to one side of the arm 146 which extends outward from the body section 122 of the latch member 120. Therefore, the actuator member 34 can be pressed into the circular recess 162 (FIG. 7) in the bezel 56 and the latch actuator section 172 inserted into the latch release slot 180.

As the actuator member 32 is pressed into the recess 162 in the bezel 56, the extent of telescopic engagement of the socket 218 (FIG. 10) with the outer end portion 222 of the drive member 86 increases. The retainer 236 engages a side surface of the socket wall 240 opposite from the opening 238. Since the socket wall 240 does not have an opening corresponding to the opening 238, the retainer 236 is ineffective to lock the actuator member onto the outer end portion 222 of the drive member 86.

When the actuator member 32 is in the position illustrated in FIG. 13, the latch actuator section 172 is in the position illustrated in FIG. 14 and extends through the latch release slot 180 in the bezel 56. Upon manual rotation of the actuator member 32 in a clockwise direction from the position shown in FIG. 13, the switch assembly 54 is actuated and the latch actuator section 172 is moved in a counterclockwise direction from the position shown in FIG. 14. As this occurs, the end portion 202 of the latch actuator section 172 moves into engagement with the arm 146 on the latch member 120.

Continued rotation of the actuator member 32 causes the leading end portion 202 of the latch actuator section 172 to move the arm 146 of the latch member 120 toward the right from the position shown in FIG. 14 to the position shown in FIGS. 15 and 16. As the latch member 120 moves toward the right, the latch pawl 124 is withdrawn into the housing 52. This results in the latch pawl 124 being disengaged from the projection 128 on the instrument panel 28 (FIG. 4). At the same time, the latch fingers 142, 144 and 148 move into alignment with slots in the instrument panel. The arm 146 on the latch member 120 engages the arcuate outer side surface 206 on the latch actuator section 172 of the actuator member 32 to retain the latch assembly 78 in the disengaged condition of FIG. 16.

Although the actuator member 32 is in the orientation shown in FIG. 13 relative to the housing 52 when the actuator member is rotated to operate the latch assembly 78 to the disengaged condition, the switch assembly 54 is actuated as the actuator member is rotated. Therefore, the switch assembly 54 is actuated to a condition in which the parking light control switch 90 and headlight control switch 94 are closed as the latch assembly is operated to the disengaged condition. At this time, the vehicle battery may be disconnected from the switch assembly 54 to prevent unnecessary energization of vehicle lights.

When the latch assembly 78 is in the disengaged condition of FIG. 16, the housing 52 can be pulled from the opening 80 in the instrument panel 28 (FIG. 4) by pulling axially outward on the actuator member 32. At this time, the latch actuator section 172 extends past the end of the latch release slot 180 (FIG. 16) into engagement with the inner side surface 214 of the bezel 56. A portion of the annular bottom wall section 277 disposed adjacent to the right end (as viewed in FIG. 7) of the latch release slot 180 is disposed between the force transmitting surface 210 (FIG. 8) on the latch actuator section 172 and the rim portion 174 of the actuator member 32.

Pulling outward on the handle portion 186 (FIG. 8) of the actuator member 32 presses the force transmitting surface 210 on the latch actuator section 172 against the inner side surface 214 (FIG. 16) on the bezel 56. The outward force transmitted from the latch actuator section 172 to the bezel 56 is effective to withdraw the housing 52 and switch assembly 54 through the opening 80 (FIG. 4) in the instrument panel 28.

When the switch control assembly 26 is to be reinstalled in the instrument panel 28, the housing 24 is merely pushed through the opening 80 while the actuator member 32 maintains the latch assembly 78 in a disengaged condition. Once the switch control assembly 26 has been positioned in the instrument panel, the actuator member 32 is rotated in a counterclockwise direction back to the position shown in FIG. 13. As this occurs, the latch actuator section 172 moves toward the position shown in FIG. 14 and the spring biased plunger 152 operates the latch assembly 78 back to the engaged condition.

The actuator member 32 can then be manually pulled off of the outer end portion 222 of the drive member. Since the retainer 236 has not engaged an opening in the side wall 240 of the socket 218, it is not necessary to insert a tool to actuate the retainer 236 to a disengaged condition in order to move the actuator member 32 away from the end portion 222 of the drive member 86. Once the socket 218 has moved out of telescopic engagement with the end portion 222 of the drive member 86, the actuator member is rotated through 180° from the position shown in FIG. 13 to the position shown in FIG. 2.

The actuator member 32 is then partially reconnected with the drive member 86 by telescopically inserting the socket 218 part way onto the end portion 222 of the drive member 86 in the manner illustrated in FIG. 10. At this time, the latch actuator section 172 engages the annular bottom wall section 277 (FIG. 7) of the circular recess 162 in the bezel 56. The latch actuator section engages the annular bottom wall section 277 at a location which is disposed counterclockwise (as viewed in FIG. 7) from the right end of the latch storage slot 178. The partial telescopic engagement of the socket 218 with the outer end portion 222 of the drive member 86 is sufficient to enable the actuator member 32 to be used to rotate the drive member 86 in a clockwise direction (as viewed in FIG. 7).

The actuator member is rotated until the latch actuator section 172 is aligned with the latch storage slot 178. The actuator member 34 can then be pressed into the circular recess 162 (FIG. 7) in the bezel 156. At this time the actuator member 32 is in the position shown in FIG. 3 and the retainer 236 (FIG. 10) is in engagement with the opening 238.

When the actuator member is rotated relative to the housing 52 to operate the latch assembly to the disengaged condition, the switch assembly 54 is actuated to the on condition in which the parking light control switch 90 and headlight control switch 94 are in the closed condition. Thus, rotation of the actuator member 32 about the axis 85 is effective to operate the latch assembly 18 and actuate the switch assembly 54 when the actuator member is in the orientation shown in FIG. 13 relative to the housing 52. When the actuator member 32 is in the orientation shown in FIGS. 2 and 3 relative to the housing 52, rotation of the actuator member about the axis 85 is effective to actuate the switch assembly 54 and is not effective to operate the latch assembly 78.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a switch assembly to be located in an instrument panel and actuatable between an actuated condition and an unactuated condition;
   a housing for said switch assembly;
   a latch assembly connected with said housing and operable between an engaged condition retaining said housing in the instrument panel and a disengaged condition in which said latch assembly is ineffective to retain said housing in the instrument panel; and
   an actuator member connected with said switch assembly and movable along an actuation path to actuate said switch assembly between the actuated and the unactuated conditions, said actuator member being movable along the actuation path to operate said latch assembly between the engaged and disengaged conditions.

2. An apparatus as set forth in claim 1 wherein said actuator member includes a surface which is engageable with said housing to enable manual force applied to said actuator member to be transmitted to said housing to move said housing relative to the instrument panel under the influence of the force manually applied to said actuator member when said latch assembly is in the disengaged condition.

3. An apparatus as set forth in claim 1 wherein said actuator member is movable along the actuation path by rotating said actuator member about an axis which is at least partially enclosed by said housing.

4. An apparatus as set forth in claim 1 wherein said actuator member is movable relative to said housing with said actuator member in a first orientation relative to said housing during movement of said actuator member along the actuation path to actuate said switch assembly between the actuated and the unactuated conditions, said actuator member being movable relative to said housing with said actuator member in a second orientation relative to said housing during movement of said actuator member along the actuation path to operate said latch assembly between the engaged and disengaged conditions, said first orientation being different than said second orientation.

5. An apparatus as set forth in claim 1 wherein said switch assembly includes a drive member which is rotatable relative to said housing by said actuator member, said drive member and actuator member including a socket which is connected with a first one of said drive and actuator members and an insert portion which is connected with a second one of said drive and actuator members and is telescopically receivable in said socket, said insert portion and socket being disposed in a first orientation relative to each other during movement of said actuator member along the actuation path to actuate said switch assembly, said insert portion and socket being disposed in a second orientation relative to each other during movement of said actuator member along the actuation path to operate said latch assembly.

6. An apparatus as set forth in claim 1 wherein said actuator member is effective to actuate said switch assembly between the actuated condition and the unactuated condition simultaneously with operation of said latch assembly between the engaged and disengaged conditions by said actuator member.

7. An apparatus as set forth in claim 1 wherein said actuator member is rotatable about a first axis through a first arcuate distance relative to said housing to effect actuation of said switch assembly between the actuated and unactuated conditions, said actuator member being rotatable about the first axis through the first arcuate distance relative to said housing to effect operation of said latch assembly between the engaged and disengaged conditions.

8. An apparatus as set forth in claim 1 further including an index assembly connected with said switch assembly, said index assembly including an index member which is movable relative to said housing between a first position and a second position upon movement of said actuator member along the actuation path to actuate said switch assembly between the actuated condition and the unactuated condition, said index member being movable relative to said housing between the first position and the second position upon movement of said actuator member along the actuation path to operate said latch assembly between the engaged condition and the disengaged condition.

9. An apparatus as set forth in claim 8 wherein said index member is in the first position when said switch assembly is in the unactuated condition, said index member being in the second position when said switch assembly is in the actuated position, said index member being in the first position when said latch assembly is in the engaged condition, said index member being in the second position when said latch assembly is in the disengaged condition.

10. An apparatus as set forth in claim 1 wherein said latch assembly includes a latch member which is in a first position when said latch assembly is in the engaged condition and a second position when said latch assembly is in the disengaged condition, said latch member being urged toward the first position by a biasing spring, said actuator member including a latch actuator section which is engageable with said latch member to move said latch member from the first position to the second position against the influence of said biasing spring upon movement of said actuator member along the actuation path.

11. An apparatus as set forth in claim 10 wherein said actuator member is rotatable through a first arcuate distance with said actuator member in a first orientation relative to said housing to actuate said switch assembly between the actuated condition and the unactuated condition, said latch actuator section being spaced from said latch member during rotation of said actuator member through the first arcuate distance with said actuator member in the first orientation, said actuator member being rotatable through the first arcuate distance with said actuator member in a second orientation relative to said housing to actuate said latch assembly between the engaged condition and the disengaged condition, said latch actuator section being engageable with said latch member during rotation of said actuator member through the first arcuate distance with said actuator member in the second orientation.

12. An apparatus as set forth in claim 10 wherein said latch actuator section has a surface which is engageable with said housing to enable manual force applied to said actuator member to be transmitted to said housing to move said housing relative to the instrument panel under the influence of force manually applied to said actuator member when said latch member is in the second position.

13. An apparatus as set forth in claim 1 wherein said actuator member includes a manually engageable handle portion which is rotatable relative to said housing, a connector portion which is connected with said handle portion and is connectable with said switch assembly, a circular rim portion which is connected with said handle portion, and an actuator section which extends from said rim portion in a direction away from said handle portion, said actuator section being engageable with said latch assembly to transmit force from said rim portion to said latch assembly to operate said latch assembly from the engaged condition to the disengaged condition during rotation of said handle portion relative to said housing.

14. An apparatus as set forth in claim 13 wherein said actuator section has a surface which is engageable with said housing to enable manual force applied to said handle portion to be transmitted to said housing to move said housing relative to the instrument panel when said latch assembly is in the disengaged condition.

15. An apparatus as set forth in claim 13 wherein said housing has first surface means for defining a first slot into which said actuator section extends during rotation of said handle portion to actuate said switch assembly between the actuated condition and the unactuated condition, said housing having second surface means for defining a second slot into which said actuator section extends during rotation of said handle portion to actuate said latch assembly between the engaged condition and the disengaged condition, said second slot being spaced from said first slot.

16. A method comprising the steps of:

retaining a housing in an instrument panel with a latch assembly;

actuating a switch assembly in the housing by manually moving an actuator member; and operating the latch assembly to release the housing for movement relative to the instrument panel by manually moving the actuator member.

17. A method as set forth in claim 16 further including moving the housing relative to the instrument panel after performing said step of operating the latch assembly to release the housing, said step of moving the housing including manually pulling on the actuator member and transmitting force from the actuator member to the housing.

18. A method as set forth in claim 16 wherein said step of actuating the switch assembly by manually moving an actuator member includes rotating the actuator member relative to the housing, said step of operating the latch assembly to release the housing by manually moving the actuator member includes rotating the actuator member relative to the housing.

19. A method as set forth in claim 16 wherein said step of actuating a switch assembly in the housing by manually moving the actuator member includes moving the actuator member along an actuation path, said step of operating the latch assembly to release the housing by manually moving the actuator member includes moving the actuator member along the actuation path.

20. A method as set forth in claim 16 wherein said actuator member is connected with the switch assembly during performance of said step of actuating a switch assembly in the housing by manually moving the actuator member and during performance of said step of operating the latch assembly to release the housing by manually moving the actuator member.

21. A method as set forth in claim 16 wherein said actuator member is connected with the switch assembly during performance of said step of actuating a switch assembly in the housing by moving the actuator member, said method further including disconnecting the actuator member from the switch assembly, changing the orientation of the actuator member from a first orientation relative to the housing to a second orientation relative to the housing, and reconnecting the actuator member with the switch assembly while the actuator member is in the second orientation relative to the housing.

22. A method as set forth in claim 16 wherein an array of indicia is connected with the housing and an indicator is connected with the actuator member, said step of actuating the switch assembly by moving the actuator member includes moving the indicator relative to the array of indicia with the indicator spaced a first distance from the array of indicia, said step of operating the latch assembly by moving the actuator member includes moving the indicator relative to the array of indicia with the indicator spaced a second distance from the array of indicia, said second distance being greater than said first distance.

23. A method as set forth in claim 16 wherein said step of operating the latch assembly to release the housing by manually moving the actuator member includes actuating the switch assembly.

24. A method as set forth in claim 16 wherein said step of operating the latch assembly to release the housing for movement relative to the instrument panel by manually moving the actuator member includes engaging a portion of the latch assembly with a portion of the actuator member and moving the portion of the latch assembly engaged by the portion of the actuator member as the actuator member is manually moved.

25. A method as set forth in claim 16 wherein said step of actuating a switch assembly by manually moving an actuator member includes rotating the actuator member from a first position to a second position about an axis of rotation with the actuator member connected with the switch assembly, the actuator member being disposed in a first angular orientation relative to the switch assembly when the actuator member is in the second position, said method further including disconnecting the actuator member from the switch assembly, moving the actuator member to a second angular orientation relative to the switch assembly, and reconnecting the actuator member with the switch assembly while the actuator member is in the second angular orientation relative to the switch assembly, said step of operating the latch assembly to release the housing for movement relative to the instrument panel by manually moving the actuator member includes rotating the actuator member about the axis of rotation after having performed said step of reconnecting the actuator member with the switch assembly.

26. A method as set forth in claim 25 wherein said step of disconnecting the actuator member from the switch assembly includes withdrawing a portion of the actuator member from a first slot in the housing, said step of reconnecting the actuator member with the switch assembly includes inserting the portion of the actuator member into a second slot in the housing, said step of operating the latch assembly to release the housing for movement relative to the instrument panel includes engaging the latch assembly with the portion of the actuator member which is inserted into the second slot.

27. A method as set forth in claim 16 wherein said step of operating the latch assembly to release the housing for movement by manually moving the actuator member includes moving a portion of the actuator member into engagement with the latch assembly and transmitting force from the portion of the actuator member to the latch assembly.

28. An apparatus comprising:
a switch assembly to be located in an instrument panel;
a housing at least partially enclosing said switch assembly;
a latch assembly connected with said housing and operable between an engaged condition retaining said housing in the instrument panel and a disengaged condition in which said latch assembly is ineffective to retain said housing in the instrument panel; and
an actuator member connected with said switch assembly and movable relative to said housing to actuate said switch assembly, said actuator member having a latch actuator section which is movable relative to said housing to operate said latch assembly from the engaged condition to the disengaged condition.

29. An apparatus as set forth in claim 28 wherein said latch actuator section of said latch member has surface means for transmitting force from said actuator member to said housing to move said housing relative to the instrument panel when said latch assembly is in the disengaged condition.

30. An apparatus as set forth in claim 28 wherein said switch assembly includes a movable switch contact, a stationary switch contact, and a drive member connected with said movable switch contact, said actuator member being releasably connectable with said drive member with said actuator member in either a first orientation relative to said drive member or a second orientation relative to said drive member, said actuator member being movable relative to said housing to move said drive member and said movable switch contact relative to said stationary switch contact when said actuator member is in the first orientation relative to said drive member, said latch actuator section of said actuator member being ineffective to actuate said latch assembly during movement of said actuator member relative to said housing when said actuator member is in the first orientation relative to said drive member, said actuator member being movable relative to said housing to move said latch actuator section to operate said latch assembly from the engaged condition to the disengaged condition during movement of said actuator member relative to said housing when said actuator member is in the second orientation relative to said drive member.

31. An apparatus as set forth in claim 30 wherein said actuator member includes a mounting portion which is disposed in a telescopic relationship with said drive member when said actuator member is connected with said drive member with said actuator member in the first orientation relative to said drive member and when said actuator member is connected with said drive member with said actuator member in the second orientation relative to said drive member.

32. An apparatus as set forth in claim 30 wherein said actuator member includes a handle portion which is manually rotatable to rotate said drive member and move said movable switch contact relative to said stationary switch contact and a rim portion which extends away from said handle portion in a direction toward said switch assembly, said latch actuator section being integrally formed as one piece with said rim portion of said actuator member.

33. An apparatus as set forth in claim 28 wherein said housing includes first surface means for at least partially defining a first arcuate slot and second surface means for at least partially defining a second arcuate slot, said second arcuate slot being spaced from said first arcuate slot, said latch actuator section of said actuator member extends into said first arcuate slot when said actuator member is in a first orientation relative to said housing, said latch actuator section of said actuator member extends into said second arcuate slot when said actuator member is in a second orientation relative to said housing, said actuator member being rotatable relative to said housing when said actuator member is in the first orientation relative to said housing and when said actuator member is in the second orientation relative to said housing, said actuator member being effective to transmit force to actuate said switch assembly upon rotation of said actuator member relative to said housing when said actuator member is in the first orientation relative to said housing and said latch actuator section extends into said first arcuate slot in said housing, said latch actuator section being ineffective to operate said latch assembly upon rotation of said actuator member relative to said housing when said actuator member is in the first orientation relative to said housing and said latch actuator section extends into said first arcuate slot, said actuator member being effective to transmit force to operate said latch assembly upon rotation of said actuator member relative to said housing when said actuator member is in the second orientation relative to said housing and said latch actuator section extends into said second arcuate slot in said housing.

34. An apparatus as set forth in claim 33 wherein said latch actuator section includes a surface area which is engageable with said housing to transmit force to move said housing relative to the instrument panel when said latch assembly is in the disengaged condition.

35. An apparatus as set forth in claim 28 wherein said actuator member is rotatable about a first axis to actuate said switch assembly, said actuator member being rotatable about the first axis to operate said latch assembly from the engaged condition to the disengaged condition.

36. An apparatus as set forth in claim 28 wherein said switch assembly includes a drive member which is rotatable relative to said housing, said drive member and actuator member including a socket which is connected with a first one of said drive and actuator members and an insert portion which is connected with a second one of said drive and actuator members and is telescopically receivable in said socket, said insert portion and socket being disposed in a first orientation relative to each other during movement of said actuator member to actuate said switch assembly, said latch actuator section being ineffective to operate said latch assembly when said insert portion and socket are disposed in the first orientation relative to each other, said insert portion and socket being disposed in a second orientation relative to each other during movement of said latch actuator section to operate said latch assembly from the engaged condition to the disengaged condition.

37. An apparatus as set forth in claim 28 wherein said actuator member is effective to operate said switch assembly during movement of said latch actuator section relative to said housing to operate said latch assembly from the engaged condition to the disengaged condition.

38. An apparatus as set forth in claim 28 further including an index assembly connected with said switch assembly, said index assembly including an index member which is movable relative to said housing between a first position and a second position upon movement of said actuator member to actuate said switch assembly between a first condition and a second condition, said index member being movable relative to said housing between the first position and the second position upon movement of said latch actuator section to operate said latch assembly between the engaged condition and the disengaged condition.

39. An apparatus as set forth in claim 28 wherein said latch assembly includes a latch member which is in a first position when said latch assembly is in the engaged condition and a second position when said latch assembly is in the disengaged condition, said latch member being urged toward the first position by a biasing spring, said latch actuator section being engageable with said latch member to move said latch member from the first position to the second position against the influence of said biasing spring.

40. An apparatus as set forth in claim 28 wherein said actuator member is rotatable relative to said housing to actuate said switch assembly and is rotatable relative to said housing to operate said latch assembly from the engaged condition to the disengaged condition.

41. An apparatus as set forth in claim 40 wherein said actuator member includes a central portion which is connected with said switch assembly and a circular rim portion which extends away from said central portion in a direction toward said switch assembly, said latch actuator section being connected with said rim portion and extends from said rim portion in a direction toward said switch assembly.

42. A method comprising the steps of:
actuating a switch assembly by rotating an actuator member connected with the switch assembly relative to a housing connected with an instrument panel by a latch assembly;
disconnecting the actuator member from the switch assembly when the actuator member is in a first orientation relative to the housing;
reconnecting the actuator member with the switch assembly when the actuator member is in a second orientation relative to the housing; and, thereafter,
operating the latch assembly to release the housing for movement relative to the instrument panel by rotating the actuator member relative to the housing.

43. A method as set forth in claim 42 wherein said step of disconnecting the actuator member from the switch assembly includes inserting a tool into the actuator member and transmitting force through the tool to release the actuator member.

44. A method as set forth in claim 42 wherein said step of disconnecting the actuator member from the switch assembly includes moving the actuator member away from the switch assembly to separate a plug and socket connection between the switch assembly and the actuator member, said step of reconnecting the actuator member with the switch assembly includes establishing a telescopic relationship between components of the plug and socket connection.

45. A method as set forth in claim 42 wherein said step of disconnecting the actuator member from the switch assembly includes withdrawing a latch actuator section of the actuator member from a first position in the housing, said step of reconnecting the actuator member from the switch assembly includes inserting the latch actuator section of the actuator member into a second position in the housing, said step of operating the latch assembly by rotating the actuator member includes moving the actuator member away from the second position.

46. A method as set forth in claim 42 further including moving the housing relative to the instrument panel by pulling the actuator member in a direction away from the switch assembly after having performed said step of operating the latch assembly to release the housing.

47. A method as set forth in claim 42 wherein the switch assembly is actuatable between a plurality of conditions by rotation of said actuator member relative to said housing, said step of disconnecting the actuator member from the switch assembly being performed when the switch assembly is in a first one of the plurality of conditions, said step of reconnecting the actuator member with the switch assembly includes partially connecting the actuator member with the switch assembly while the switch assembly is in the first one of the plurality of conditions, rotating the actuator member relative to the housing while the actuator member is partially connected with the switch assembly to actuate the switch assembly from the first one of the plurality of conditions to a second one of the plurality of conditions, and completing connection of the actuator member with the switch assembly while the switch assembly is in the second one of the plurality of conditions.

48. A method as set forth in claim 47 wherein said step of actuating the latch assembly to release the housing for movement relative to the instrument panel by rotating the actuator member relative to the housing includes actuating the switch assembly from the second one of the plurality of actuated conditions to another one of the plurality of actuated conditions.

49. A method as set forth in claim 42 wherein said step of operating the latch assembly to release the housing for movement relative to the instrument panel by rotating the actuator member relative to the housing includes moving a leading portion of the latch actuator section connected with the actuator member into engagement with the latch assembly as the actuator member is rotated relative to the housing, moving a latch member in the latch assembly under the influence of force transmitted from the leading portion of the latch actuator section to the latch assembly during continued rotation of the actuator member, moving a side portion of the latch actuator section into engagement with the latch assembly during continued rotation of the actuator member relative to the housing, and retaining the latch assembly in a condition in which the housing is released for movement relative to the instrument panel under the influence of force transmitted between the side portion of the latch actuator section and the latch assembly upon interruption of rotation of the actuator member relative to the housing.

50. A method as set forth in claim 49 further including the steps of moving the housing relative to the instrument panel while the latch assembly is in the condition in which the housing is released for movement relative to the instrument panel by pulling on the actuator member.

51. An apparatus comprising:

a switch assembly to be located in an instrument panel;

a housing at least partially enclosing said switch assembly; and an actuator member connected with said switch assembly and rotatable relative to said housing to actuate said switch assembly, said actuator member including a force transmitting surface which is engageable with said housing to transmit force applied to said actuator member directly to said housing to move said housing relative to the instrument panel under the influence of force applied to said actuator member.

52. An apparatus as set forth in claim 51 wherein said switch assembly includes a drive member which is rotatable relative to said housing by said actuator member, said drive member and actuator member including a socket which is connected with a first one of said drive and actuator members and an insert portion which is connected with a second one of said drive and actuator members and is telescopically receivable in said socket, said insert portion and socket being disposed in a first orientation relative to each other during rotation of said actuator member relative to said housing to actuate said switch assembly, said insert portion and socket being disposed in a second orientation relative to each other during engagement of said force transmitting surface on said actuator member with said housing.

53. An apparatus as set forth in claim 51 wherein said housing has first surface means for defining a first slot and second surface means for defining a second slot, said force transmitting surface being disposed on a portion of said actuator member which extends into said first slot during rotation of said actuator member relative to said housing to actuate said switch assembly, said portion of said actuator member on which said force transmitting surface is disposed extends into said second slot during engagement of said force transmitting surface with said housing.

54. An apparatus as set forth in claim 51 wherein said actuator member includes a handle portion which is manually pulled to press said force transmitting surface against said housing to transmit force from said actuator member directly to said housing.

55. An apparatus as set forth in claim 51 wherein said actuator member include a circular rim portion and a force transmitting portion which is integrally formed as one piece with said rim portion and extends outward from said rim portion, said force transmitting surface being disposed on said force transmitting portion of said actuator member and faces toward said rim portion of said actuator member.

56. A method comprising:

retaining a housing in an instrument panel with a latch assembly;

actuating a switch assembly in the housing by rotating an actuator member connected with the switch assembly relative to the housing;

operating the latch assembly to release the housing for movement relative to the instrument panel; and, thereafter, pulling on the actuator member to move the housing relative to the instrument panel under the influence of force transmitted directly from the actuator member to the housing, said step of pulling on the actuator member to move the housing includes pressing a surface on the actuator member against a surface on the housing to transmit force directly from the actuator member to the housing.

57. An apparatus as set forth in claim 56 wherein said step of operating the latch assembly to release the housing for movement relative to the instrument panel includes rotating the actuator member from a first position to a second position relative to the housing, said step of pulling on the actuator member being performed with the actuator member in the second position relative to the housing.

58. An apparatus as set forth in claim 56 wherein said step of rotating an actuator member connected with the switch assembly relative to the housing includes moving the actuator member along an actuation path, said step of pulling on the actuator member to move the housing relative to the instrument panel includes pulling on the actuator member in a direction which extends transverse to the actuation path and away from the housing.

59. An apparatus as set forth in claim 56 wherein said actuator member is connected with the switch assembly during performance of said step of actuating a switch assembly in the housing by rotating the actuator member and during performance of said step of pulling on the actuator member to move the housing relative to the instrument panel under the influence of force transmitted directly from the actuator member to the housing.

60. An apparatus as set forth in claim 56 further including the steps of disconnecting the actuator member from the switch assembly when the actuator member is in a first orientation relative to the housing, and reconnecting the actuator member with the switch assembly when the actuator member is in a second orientation relative to the housing, said step of pulling on the actuator member to move the housing relative to the instrument panel being performed after performance of said step of reconnecting the actuator member with the switch assembly when the actuator member is in the second orientation.

61. An apparatus as set forth in claim 60 wherein said step of disconnecting the actuator member from the switch assembly includes inserting a tool into the actuator member and transmitting force through the tool to release the actuator member.

* * * * *